United States Patent
Al Afandi et al.

(10) Patent No.: US 9,950,437 B2
(45) Date of Patent: Apr. 24, 2018

(54) METHODS AND APPARATUSES FOR PREPARING SHAWARMA, GYROS AND DONER KEBAB SANDWICHES AND MEALS

(71) Applicants: Anas Al Afandi, Damscus (SY); Ahmad Rashed Edlbi, Damscus (SY)

(72) Inventors: Anas Al Afandi, Damscus (SY); Ahmad Rashed Edlbi, Damscus (SY)

(*) Notice: Subject to any disclaimer, the term of this patent is extended or adjusted under 35 U.S.C. 154(b) by 0 days.

(21) Appl. No.: 14/666,400

(22) Filed: Mar. 24, 2015

(65) Prior Publication Data
US 2015/0306778 A1    Oct. 29, 2015

Related U.S. Application Data

(60) Provisional application No. 61/984,552, filed on Apr. 25, 2014.

(51) Int. Cl.
| | |
|---|---|
| *B23D 1/16* | (2006.01) |
| *A23L 13/00* | (2016.01) |
| *A23L 5/00* | (2016.01) |
| *B26D 1/16* | (2006.01) |
| *B65B 5/04* | (2006.01) |

(Continued)

(52) U.S. Cl.
CPC .............. *B26D 1/16* (2013.01); *A23L 5/00* (2016.08); *A23L 13/00* (2016.08); *A23P 10/00* (2016.08); *A23P 20/20* (2016.08); *A23P 20/25* (2016.08); *B26D 5/005* (2013.01); *B65B 5/04* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 2,599,328 | A | * | 6/1952 | Hoenselaar .................... 426/645 |
| 4,137,839 | A | * | 2/1979 | Couture .................. A47J 17/16 |
| | | | | 99/541 |

(Continued)

FOREIGN PATENT DOCUMENTS

| | | | |
|---|---|---|---|
| TR | 201204592 A2 * | 12/2012 | .................. 99/421 V |
| WO | WO 2009/085022 | 7/2009 | |

OTHER PUBLICATIONS

Better Homes and Garden, Smoke Lamb Gyro Recipe, captured Mar. 19, 2013. <https://web.archive.org/web/20130319024943/http://www.bhg.com/recipe/smoky-lamb-gyros/>.*

(Continued)

*Primary Examiner* — Viren A Thakur
*Assistant Examiner* — Thanh H Nguyen
(74) *Attorney, Agent, or Firm* — Schwabe Williamson & Wyatt, PC

(57) ABSTRACT

Methods and apparatuses for preparing sandwiches (subs, wraps) and meal, such as Shawarma, Gyros and Doner Kebab sandwiches and meals. The apparatus includes a grilling mechanism, a smoking mechanism, a slicing mechanism, sandwich and meal assembly mechanism, sandwich wrapping and packing mechanism and accepting money and credit card mechanism. The slicing mechanism is configured to slice a cylinder or cone of meat in an automated, substantially helical slicing pattern. The sandwich assembly includes various components to automatically dispense selected bread, condiments, and other sandwich and meal ingredients and wrapping and packing the sandwich.

18 Claims, 26 Drawing Sheets

(51) Int. Cl.
*B26D 5/00* (2006.01)
*A23P 20/20* (2016.01)
*A23P 10/00* (2016.01)
*A23P 20/25* (2016.01)

(56) References Cited

U.S. PATENT DOCUMENTS

| | | | |
|---|---|---|---|
| 5,531,156 A * | 7/1996 | Brummett | 99/450.1 |
| 7,281,468 B2 * | 10/2007 | Frem | G07F 9/105 |
| | | | 99/334 |
| 7,543,529 B1 * | 6/2009 | Carpenter et al. | 99/421 V |
| 2005/0193901 A1 * | 9/2005 | Buehler | 99/468 |
| 2008/0250944 A1 * | 10/2008 | Pryor et al. | 99/537 |
| 2011/0203570 A1 * | 8/2011 | Popeil et al. | 126/369 |

OTHER PUBLICATIONS

Thrillist, Greek Stop Mediterranean Food Truck, Captured Nov. 30, 2012. <https://web.archive.org/web/20121130022548/http://www.thrillist.com/food/minneapolis/downtown/greek-stop-mediterranean-food-truck_mediterranean_street-food_food-trucks?>.*

Chicago-Pipeline, Now Open: Covo Gyro Market. <http://chicago-pipeline.com/2012/09/06/now-open-covo-gyro-market/>.*

Great Lakes Radio Video, Spiral Ham Slicing, Youtube, published Mar. 25, 2013 <https://www.youtube.com/watch?v=XwpHKYENZe8>).*

Clueless in Egypt, I'll take one of Everything, <https://cluelessinegypt.wordpress.com/2011/07/02/ill-take-one-of-everything/>.*

* cited by examiner

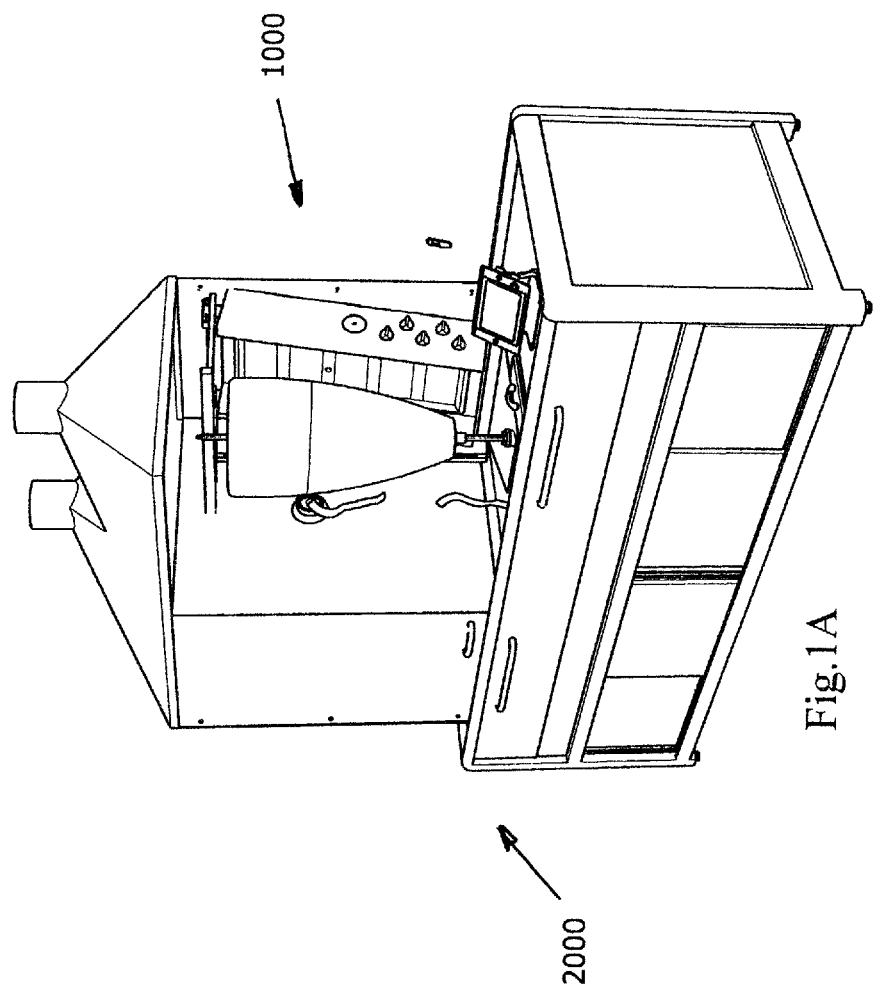

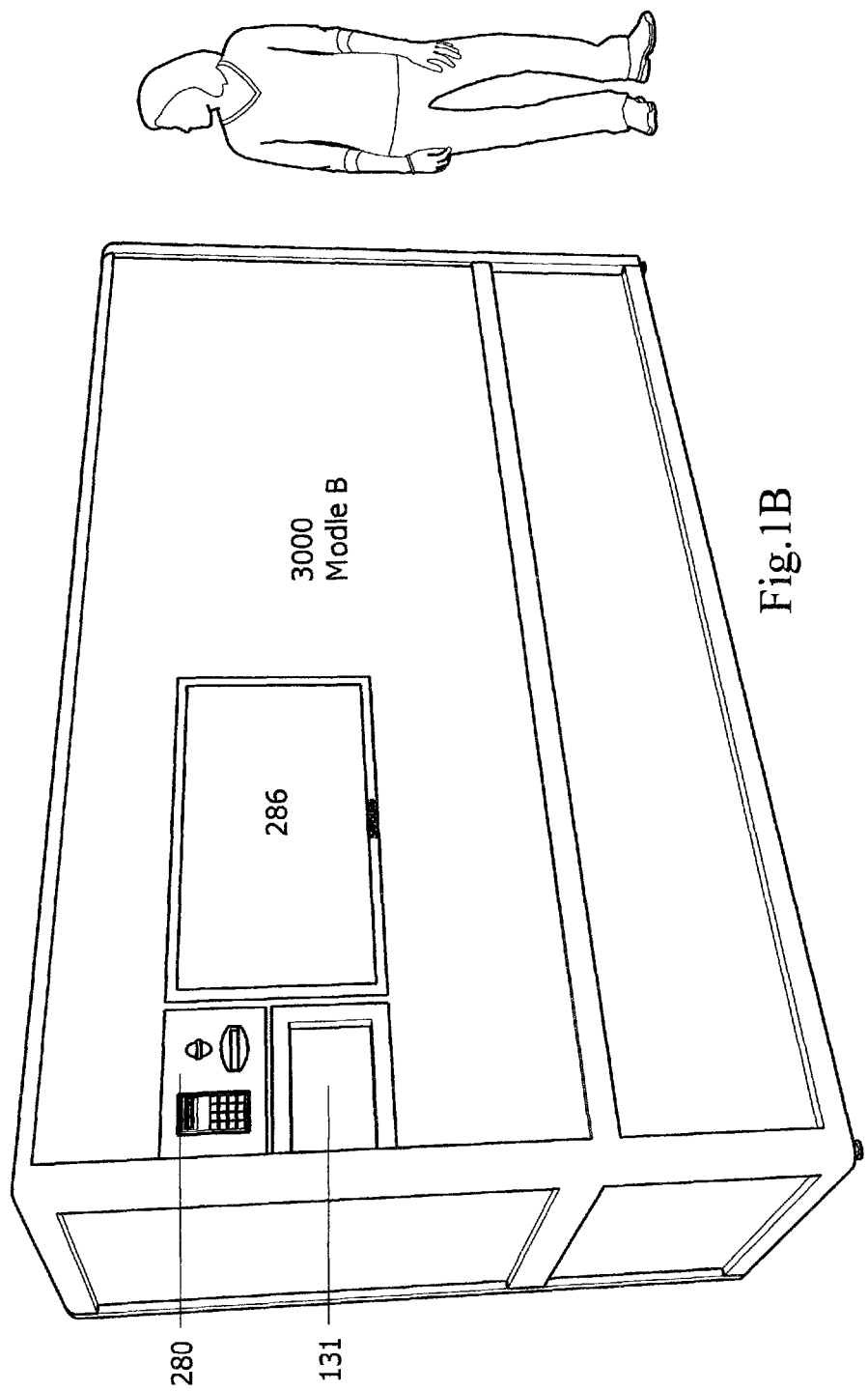

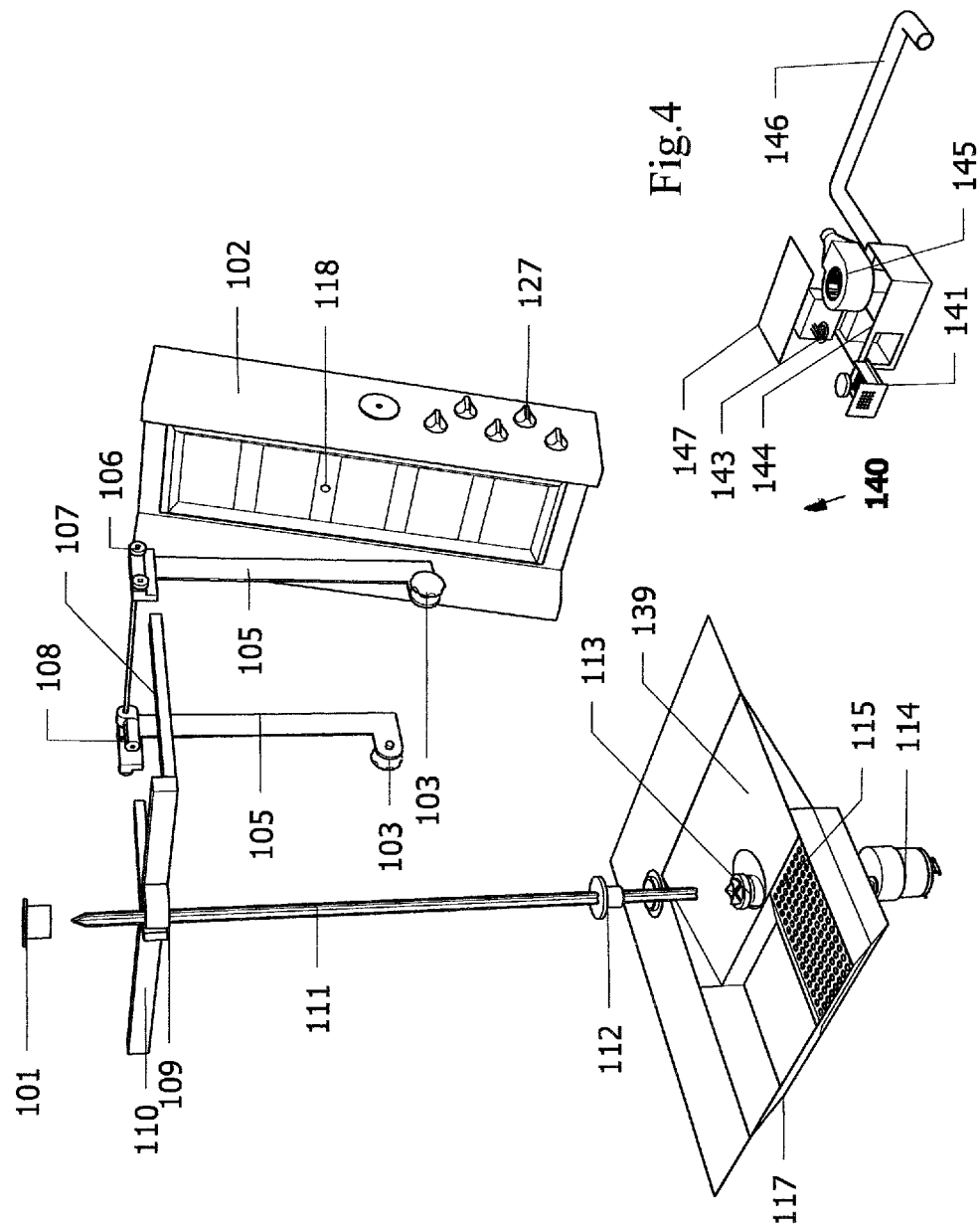

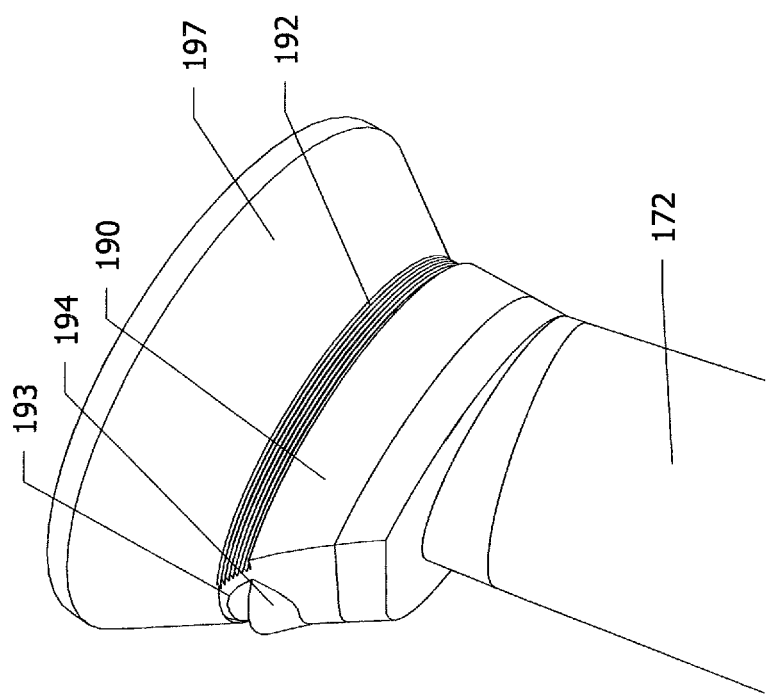

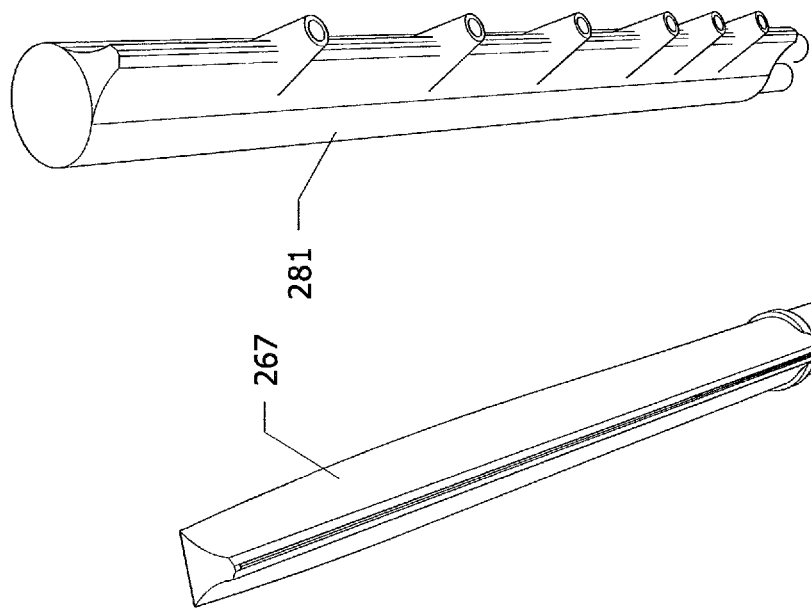
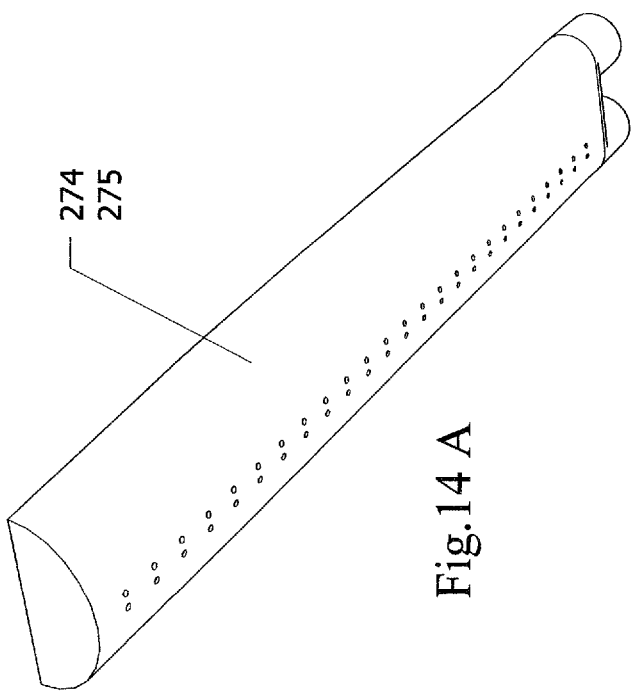
Fig.14 A
Fig.14 B
Fig.14 C

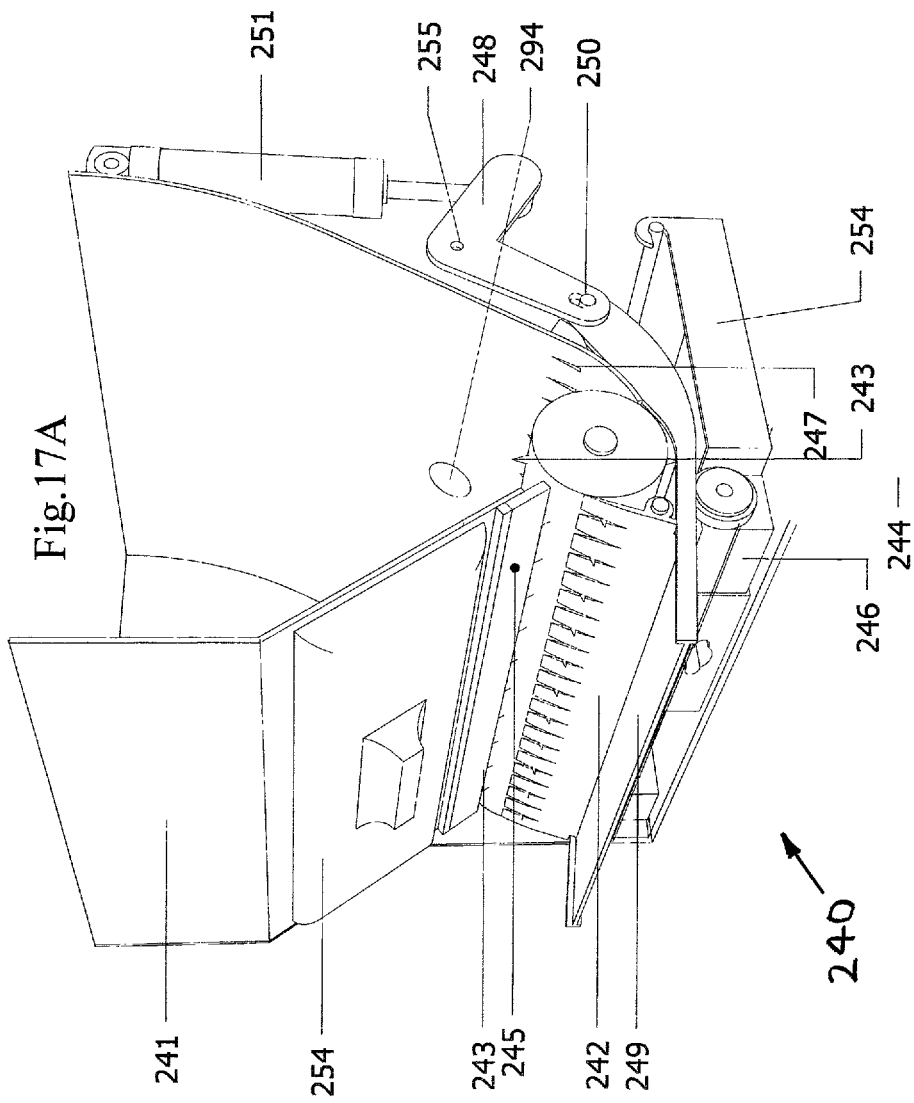

METHODS AND APPARATUSES FOR PREPARING SHAWARMA, GYROS AND DONER KEBAB SANDWICHES AND MEALS

CROSS-REFERENCES TO RELATED APPLICATIONS

This is a utility patent application taking priority from provisional application No. 61/984,552 filed on Apr. 25, 2014.

BACKGROUND OF THE INVENTION

1. Field of the Invention

The present invention relates generally to food preparation and more specifically to methods and apparatuses for preparing Shawarma, Gyros and Doner kebab sandwiches and meals, which decreases the amount of time required to fill an order.

2. Discussion of the Prior Art

Doner Kebab, Shawarma or Gyros are some of the most common fast food offerings worldwide. This type of food is based on roasting different types of meat, e.g., beef, chicken, lamb, veal or another similar type of meat. The meat is roasted by inserting a vertical spindle 111 through the meat, and then placing the meat and spindle into a grilling unit which slowly rotates the spindle, thereby evenly cooking the meat. Traditionally, the roasted meat is then sliced by a skilled laborer, and used to prepare a sandwiches (subs and wraps) and meal using a piece of bread with other additives such as mayonnaise, pickles, tomatoes, cubed French fries, different sauces and salads to form a fast meal. This type of food has met with only limited acceptance by large fast food companies because of the scarcity of the skilled labor required to prepare this type of food, along with the long period of time required to cook and sliced the meat.

Slicing roasted meat is still a manual task nearly everywhere. Even when the slicing process is automated to some extent, there is still need for manual intervention for at least part of the process. For example, International Patent Application WO 2009/085022, where the meat is sliced automatically but with low speed and complications which will be explained later. The disclosed invention overcomes these shortcomings and improves upon the prior art with additional features, such as automatic meat smoking and automated sandwich and meal preparation, where a customer-selected type of bread is filled with the desired ingredients provided through an accurate dosing mechanism. Further, the sandwich is heated without any manual intervention, and is packed in paper or foil printed with all the information of the order in speedy, high quality and hygienic manner.

Key deficiencies of the prior art are addressed by the disclosed invention are discussed in the following paragraphs. In the traditional method of Shawarma, Gyros and Doner Kebab preparation, the person in charge of meat slicing may be subjected to high temperatures in summer and large temperature swings in winter, especially when roasting is done out of doors, which can result in injury or illness. In the disclosed invention, the operator is not subject to these heat effects, as the grilling process is enclosed and substantially automated.

Meat slicing in the traditional fashion is sometimes done prematurely, and may result in the person doing the slicing being burned if they do not take proper care in close proximity to the heat source. Furthermore, manual slicing may result in inconsistent slice thickness due to lack of experience. The disclosed invention addresses these deficiencies by either notifying the operator that roasting is completed or automating roasting times, and, when the operator requires sliced meat, automating the slicing process while controlling for a fixed slice thickness. Furthermore, the disclosed invention can optionally completely automate the smoking, cooking and slicing process and once started in an automatic mode, will require no intervention from the operator to complete all roasting, smoking, and slicing steps.

Prior art methods of roasting commonly employ gas or electrical forms of heat, which do not inherently add to the meat flavor. If a smoked flavor is desired to be added, this is normally accomplished by roasting using natural coal. Compared to gas or electrically produced heat, roasting using natural coal results in slow production, additional cost and efforts. Where a smoked flavor is desired, the disclosed invention improved over the prior art by providing a smoking taste for the meat when it is placed inside a glass enclosure supplied with the smoked air without any additional time, effort or cost.

In the prior art methods of roasting, the Shawarma cone is subjected to air pollution while being grilled. The disclosed invention isolates the Shawarma cone within a glass enclosure, preventing contamination from external pollutants.

The aforementioned International Patent Application WO 2009/085022 discloses a method of slicing the meat vertically similar to the traditional manual way. This imposes an additional time requirement to store slices, slowing the production process, as it requires multiple cycles of slicing up and down to complete. Furthermore, due to the nature of the vertical slicing mechanism, the invention disclosed in the International Patent Application leaves a dead zone of meat at the bottom of the Shawarma cone that the slicing mechanism cannot reach, either wasting this meat, or requiring it to be processed manually, thereby defeating the purpose of the automated slicing. Finally, this prior art invention requires that the Shawarma cone be substantially cylindrical in shape, as opposed to the traditional conical shape, for it to work most efficiently. The disclosed invention slices the meat in a helical and spiral pattern, starting from the top and proceeding to the bottom of the Shawarma cone in a single pass. As a result, the time required to complete the slicing process is minimized, no dead zone of meat is left to require subsequent manual processing, and the slicing mechanism is not sensitive to the shape of the Shawarma cone. These advantages speeding production and maximize resulting profits.

Slicing in the prior art (WO 2009/085022) utilizes an unnecessarily complicated light scanning method to control the slicing arm. This introduces the risk that the light sensor may become fouled from food residue, resulting in malfunction. The disclosed invention, in contrast, employs a simple mechanical method by way of a clutch, which makes the slicing arm move according to the shape of the Shawarma cone accurately and easily. This method reduces the cost of the disclosed invention, its associated maintenance requirements, and reduces errors and malfunctions.

Sandwich and meal filling with its ingredients in the traditional manual way has many deficiencies like air pollution, non-hygienic labor, and deterioration of the sandwich's cold ingredients due the excessive heat. The disclosed invention addresses these deficiencies by continuously storing the cold sandwich ingredients in refrigerated chambers away from pollution.

Manual material dosing can result in inconsistent taste in the final product, which in turn harms customer trust and retention. The disclosed invention addresses these problems by implementing an automatic dosing system; solid ingredients are precisely weighed, and time controlled pumps ensure precise quantities of liquid ingredients.

Manual sandwich and meal preparation is also slow and inefficient, resulting in customers potentially waiting a significant amount of time to receive their order, again harming customer trust and retention. The disclosed invention is capable of doing the same work in a much shorter time.

The traditional manual way is also prone to mistakes, especially for customers who have complex and detailed orders for varying types and quantities of ingredients. The disclosed invention helps mitigate this problem by automatically performing sandwich and meal assembly, and printing the order information on the packing paper. Order specifics may be entered either by the machine operator or, to further reduce the possibility of mistake, directly by the customer.

The traditional manual method of Shawarma preparation requires skilled and patient labor, reducing the spreading of this kind of fast food and increasing its cost. The disclosed invention requires less manual labor, and the required staffing does not need the same level of skill, which reduces the cost to provide sandwiches and thus the ultimate sandwich and meal price.

Further, restaurants preparing these sandwiches and meals in the traditional fashion can suffer from variable quality. The disclosed invention, with its automated sandwich and meal assembly process, assures consistent quality and taste, thereby enhancing customer experience and retention. By some amendments like canceling the top section that make grilling, smoking, slicing and exchange it with ready slices that use in special refrigerated store then heat it when we need to use that slices and add it to sandwiches and meals we can use the machine in direct sell for Shawarma products in different gathering areas like airports, schools, universities, company's offices, malls and etc. The machine need also for credit card and money accepting mechanism to use it in direct sales model. Finally, the disclosed invention is scalable in size, and can be adapted to a mobile platform requiring a minimum of support personnel. With a mobile size, the disclosed invention can provide sandwiches and meal to different customers in temporary crowded areas such as stadiums, arenas, public gardens, sea shows etc.

SUMMARY OF THE INVENTION

The present disclosure is directed to methods and apparatuses for preparing Shawarma, Gyros and Doner Kebab sandwiches and meals. The apparatus includes a grilling mechanism, a smoking mechanism, a slicing mechanism, and a sandwich and meal assembly mechanism. The slicing mechanism is configured to slice a cylinder or cone of meat in an automated, substantially helical and spiral slicing pattern. The sandwich and meal assembly includes various components to automatically dispense selected bread, condiments, and other sandwich and meal ingredients.

Accordingly, it is an object of the present invention to provide methods and apparatuses for preparing Shawarma, Gyros and Doner Kebab sandwiches and meals, which decreases the amount of time required to fill an order.

BRIEF DESCRIPTION OF THE DRAWINGS

FIG. 1A is a perspective view of an apparatus for preparing Shawarma sandwiches and meals.

FIG. 1B is a perspective view of a second embodiment of an apparatus for preparing Shawarma sandwiches and meals to sell directly to a customer.

FIG. 4 is an exploded perspective view of a Shawarma grilling and smoking device of an apparatus for preparing Shawarma sandwiches and meals.

FIG. 7A is a perspective view of a slicing head and arm of an apparatus for preparing Shawarma sandwiches and meals.

FIG. 14A is a perspective view of a sauce dropping head of an apparatus for preparing Shawarma sandwiches and meals.

FIG. 14B is a perspective view of a mayonnaise dropping head of an apparatus for preparing Shawarma sandwiches and meals.

FIG. 14C is a perspective view of a dropping head of an apparatus for preparing Shawarma sandwiches and meals.

FIG. 17A is a left side perspective view of an ingredient storage of an apparatus for preparing Shawarma sandwiches and meals.

DETAILED DESCRIPTION OF THE INVENTION

The disclosed apparatus for preparing Shawarma, Gyros and Doner Kebab sandwiches and meals will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of apparatuses for preparing Shawarma sandwiches and meals examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 2:
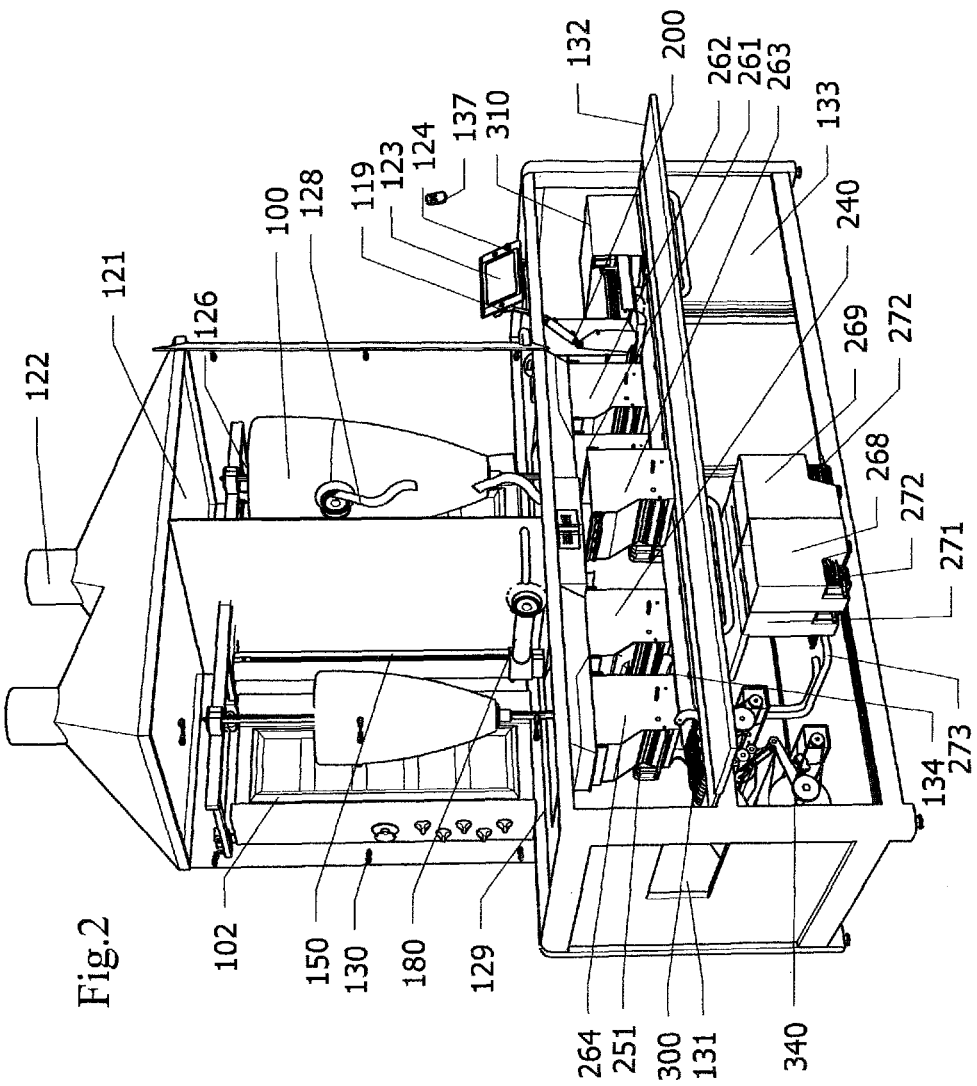
FIG. 2 is a perspective view of an apparatus for preparing Shawarma sandwiches and meals with access doors and panels removed to reveal interior components.

With reference to FIGS. 1A-3B, an overview of the operation of an apparatus for preparing Shawarma sandwiches and meals will now be described. The machine is comprised of two main linked parts or separated, demonstrated in FIG. 1A: the upper part of the machine 1000 which performs the grilling, smoking and slicing, and the lower part 2000, which performs sandwich and meal assembly. Turning to FIG. 2, the machine is controlled by an automatic control unit 116, which receives orders through the touch-operated control screen 123, which has an emergency button 124, remote control sensor 120 and speaker 119. The machine can also be controlled by remote control 137.

Figure 3A:
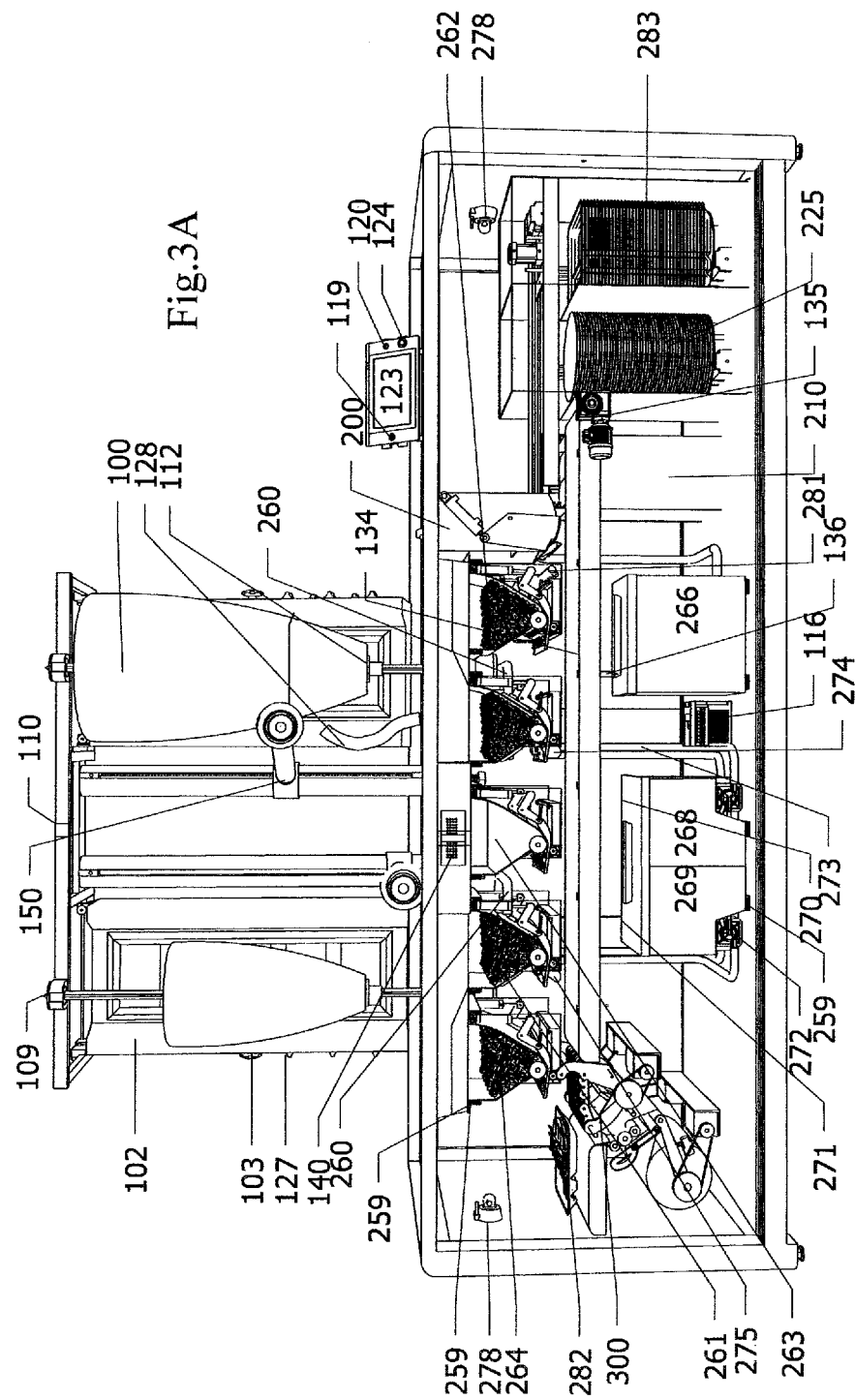
FIG. 3A is a front view of an apparatus for preparing Shawarma sandwiches and meals with access doors and panels removed to reveal interior components.
Figure 3B:
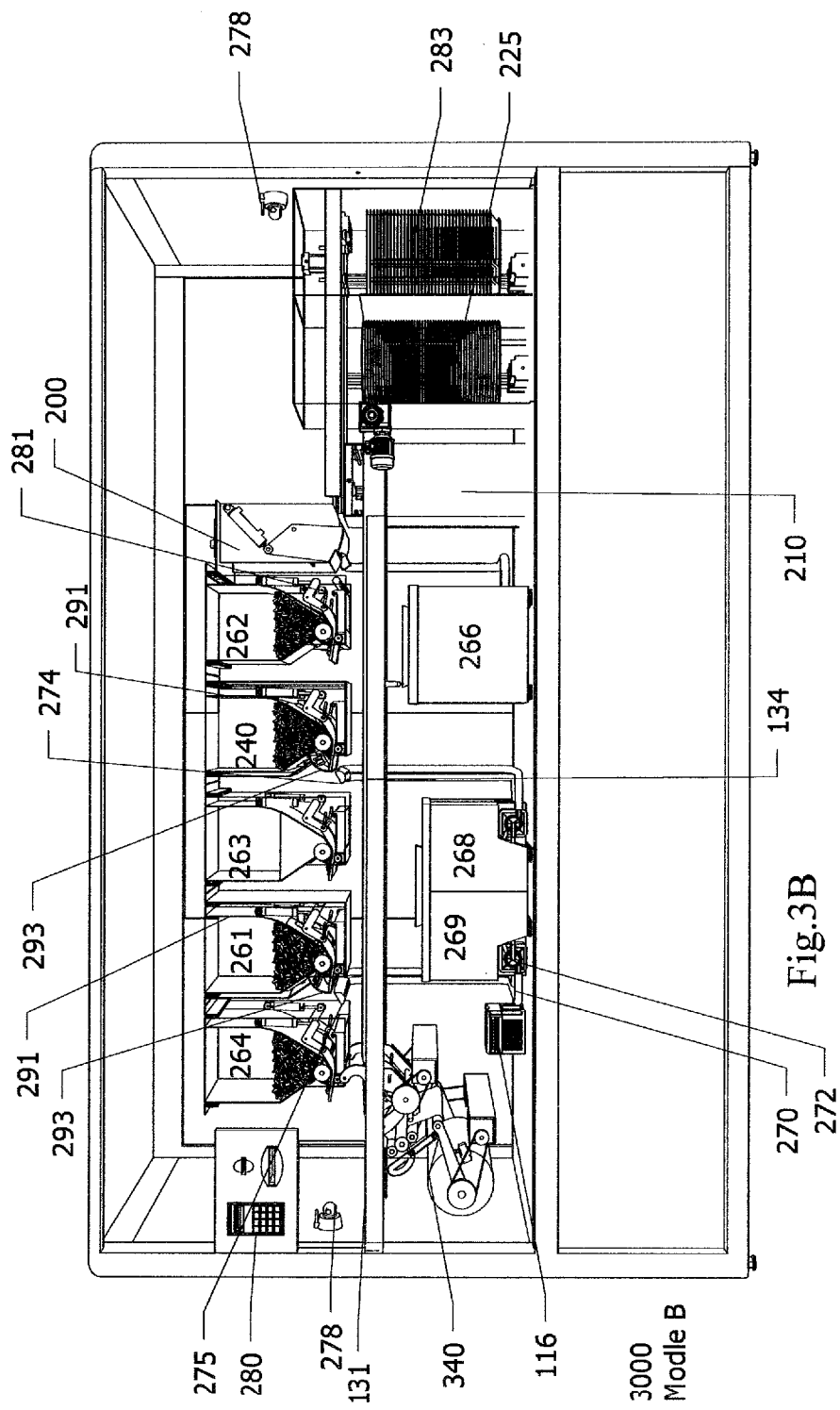
FIG. 3B is a front view of a second embodiment of an apparatus for preparing Shawarma sandwiches and meals with access doors and panels removed to reveal interior components for selling directly to customers.

Operation of the Shawarma Grilling, Smoking and Slicing Mechanisms:

With reference to FIGS. 3A and 4, an example of the Shawarma grilling and smoking mechanism will now be described. The Shawarma cone 100 is fixed on the spindle 111 in a conical shape. The Shawarma cone 100 is inverted so that it faces up. In the example apparatus, up to two different kinds of Shawarma cone meats as required may be inserted into each respective glass enclosure 126. The glass in each enclosure has vent holes 129 in the bottom, with the glass panels fixed together by joints 130. The enclosure 126 may be equipped with a filter 121 and chimney funnel 122 at the top to safely vent away smoke and cooking fumes. The small fixed disc 112 at the bottom of the spindle 111 provides support for the Shawarma cone 100. Optionally, the Shawarma cone 100 can be supported by a pin in lieu of or in conjunction with the small fixed disc 112. The grills 102 may be operated by cooking gas, electricity, or another suitable heat source, and are placed on a pivot 104 so as to provide control over the angle of the grills relative to the Shawarma cone 100 by means of handle 103. The grills 102 are supported by a grill carrier arm 105, which is guided by a grill horizontal rail 107. The horizontal movement of the grill is controlled by a motor 108, which slides by a moving mechanism 106. The distance between the grill and the Shawarma cone 100 is controlled by a distance sensor 118, which keeps the distance between the grill and the Shawarma cone 100 at the optimal range to ensure even and consistent roasting. The gas/electricity operated grills 102 are controlled by electric valves through the control touch screen 123 or a manual valve 127 in case of emergency. The spindle 111 carrying the Shawarma cone 100 is fixed at the top by bearing 101. This bearing 101 is fixed on a top base 109 carried by a beam 110. The spindle 111 at the bottom is carried by a rotating base 113 controlled by rotating motor 114, which has two speeds.

Grilling is done while the spindle 111 carrying Shawarma cone 100 is rotating slowly, this cooking speed controlled by a rotating motor 114. In the first grilling process the required time for the Shawarma to be well done is monitored, then this time is fed by the operator 223 into the memory of the automatic control unit 116. During subsequent grilling processes an alarm is triggered through speakers 119, when the predetermined time is reached. The operator 223 can then initiate the slicing by remote control 137 or control touch screen 123. Alternatively, the automatic control unit 116 can start the slicing process automatically when set in automatic slicing mode. In this way, improper cooking of the Shawarma cone due to operator error is avoided. The varying meat height fixed on the spindle 111 is controlled by a control touch screen 123 by the operator 223. During grilling, smoked air may be introduced in to the glass enclosure 126 having the Shawarma cone 100 and the slicing component 150 to impart a smoked flavor to the Shawarma, if desired. The smoke is provided from smoking component 140, where the smoke enters the glass enclosure 126 through smoking vents 115.

Figure 5:
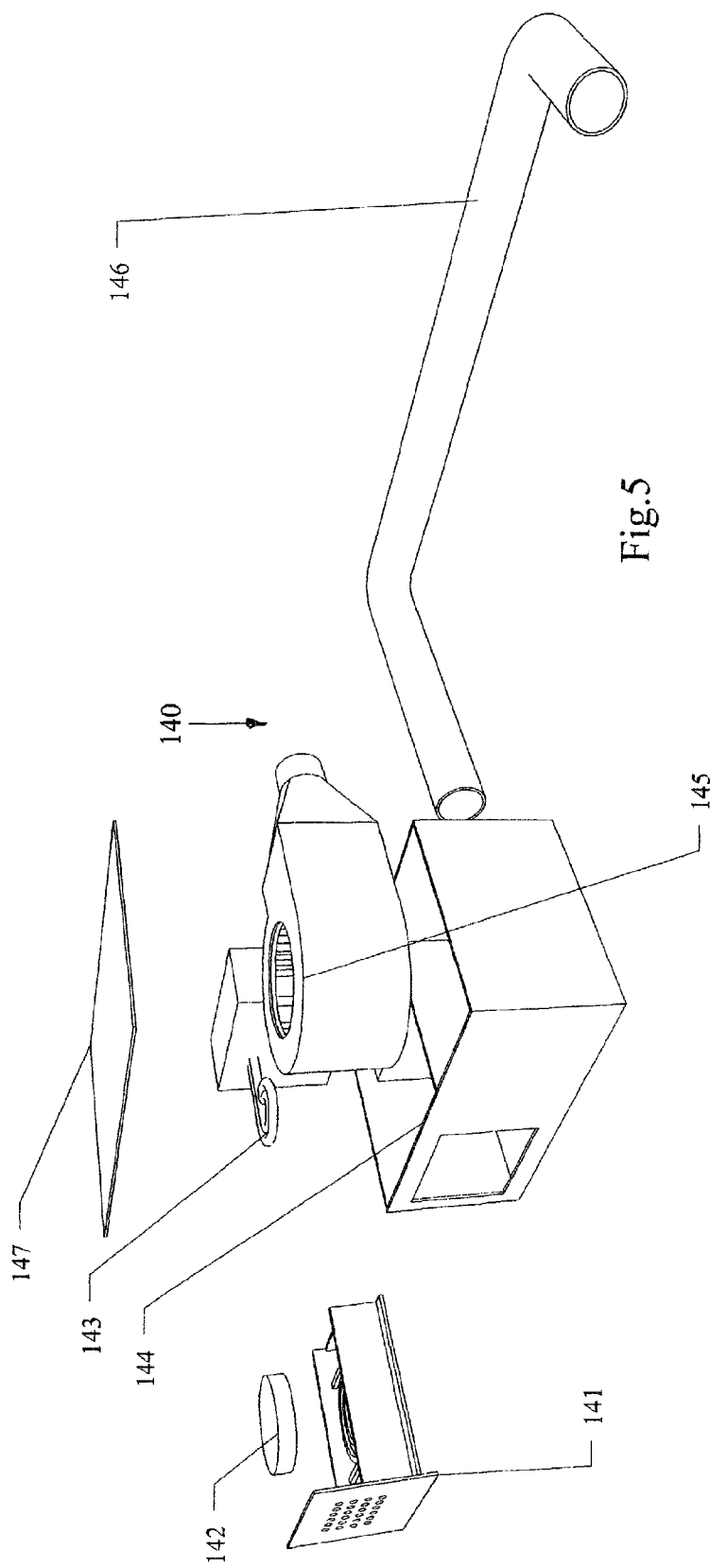
FIG. 5 is an exploded perspective view of a smoking device of an apparatus for preparing Shawarma sandwiches and meals.

With reference to FIG. 5, an example of smoking component 140 will now be described. Smoking component 140 comprises a special wooden disc 142 having suitable fat 33 to impart the required taste. The special wooden disc 142 is placed in the smoking enclosure 144, accessed through a smoking drawer 141, where it is subjected to suitable heat by a heater 143. When the wooden disc 142 is heated sufficiently, it starts smoking with the desired smell. A fan 145 blows smoke from the smoking enclosure 144 through a smoke pipe 146 to the glass enclosure 126. The smoke enters through smoking vents 115, imparting the desired flavor to the Shawarma cone 100 while it is roasted. Before slicing, the smoke may be evacuated from the glass enclosure 126 to allow the slicing process to be clearly seen. If a stronger smoke flavor is desired, the smoke can also be directed through smoke pipe 146 to the roasted Shawarma stores 240 and 261 by way of smoked air ducts 260 and smoked air vents 247. There, the roasted Shawarma slices will further absorb the smoke taste. The introduction of the smoke, its timing and duration, the heater 143, and the smoke fan 145 may be controlled by the automatic control unit 116, pursuant to instructions programmed through the control touch screen 123.

Figure 6:
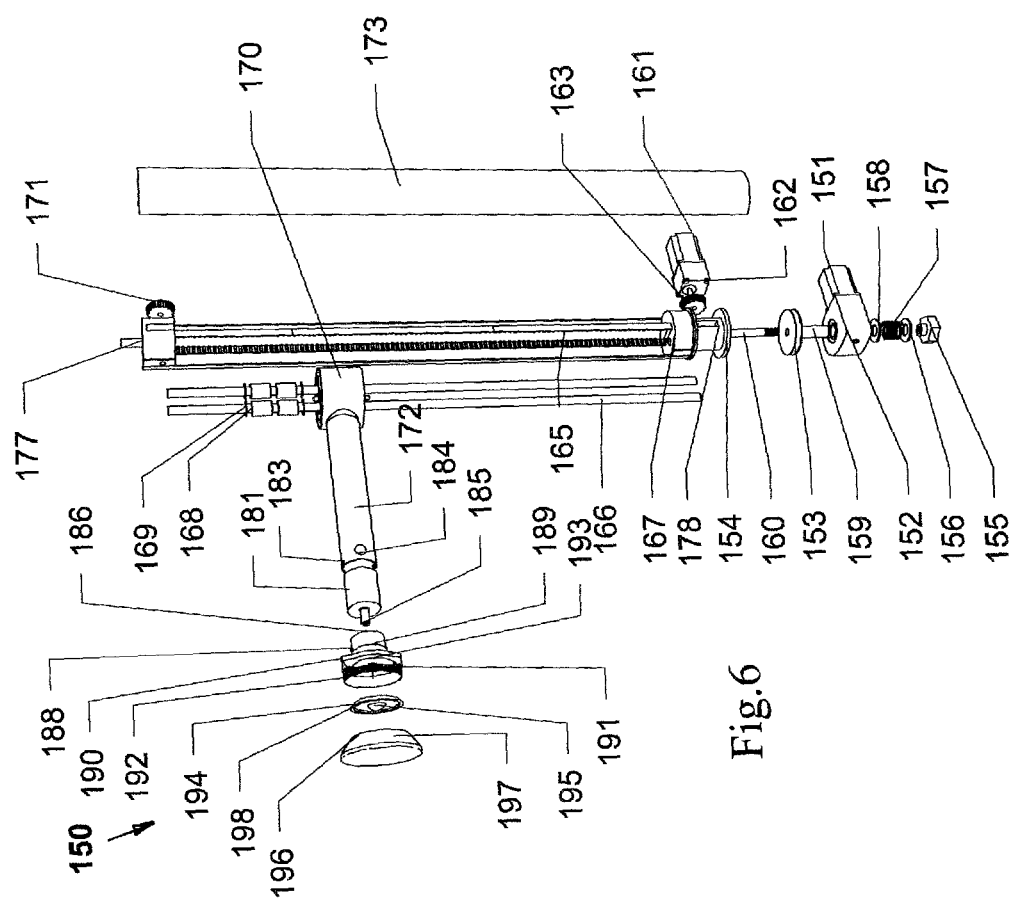
FIG. 6 is an exploded perspective view of a slicing device of an apparatus for preparing Shawarma sandwiches and meals.
Figure 7:
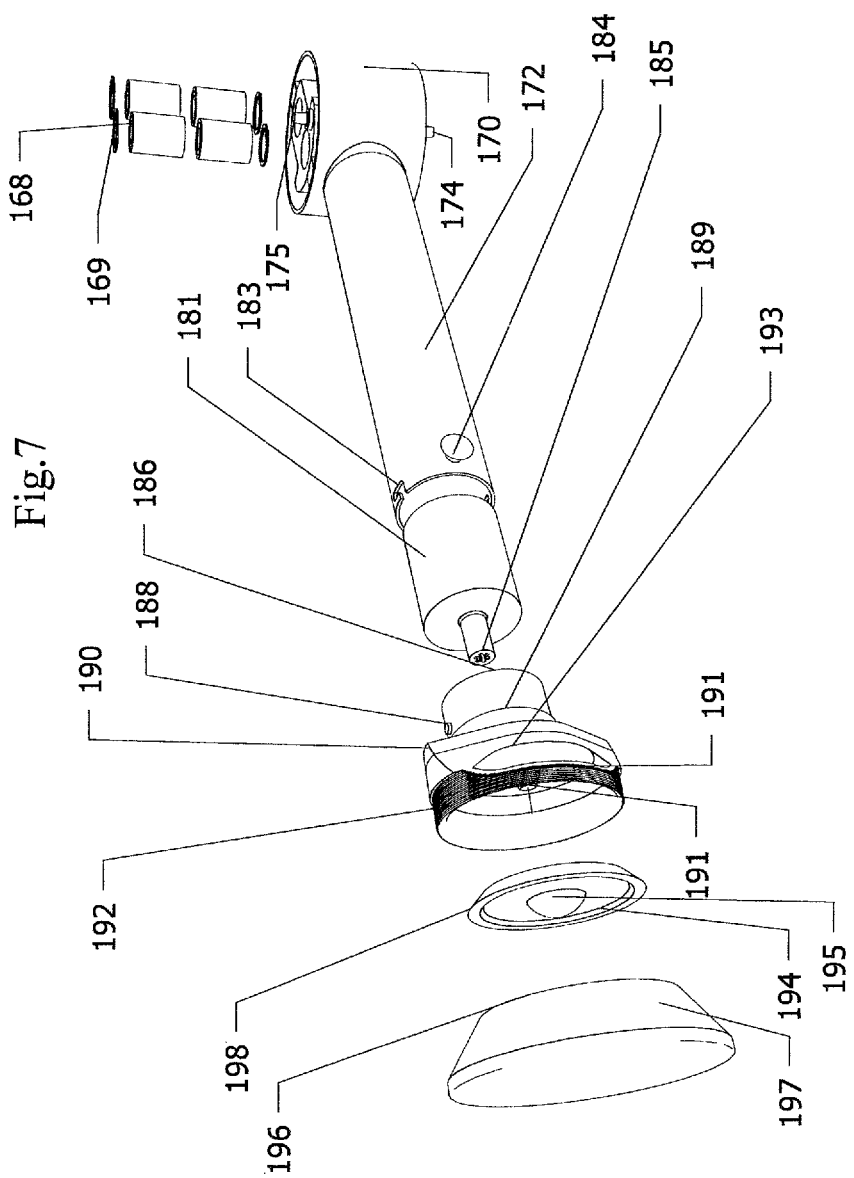
FIG. 7 is an enlarged perspective view of the rotating knife and carriage arm assembly of a slicing device of an apparatus for preparing Shawarma sandwiches and meals.

With reference to FIGS. 6, 7 and 7A, an example of the slicing component will now be described in the following paragraphs. The slicing component 150 is fixed on the main tray 139 at fixed point 125. The slicing component comprises a slicing arm 172 having a slicing blade 194 fixed on it. The blade has a beveled edge 198. The slicing arm 172 moves vertically as the Shawarma cone 100 rotates to achieve slicing of the grilled Shawarma cone 100 by a fixed thickness, thereby creating Shawarma slices 128. The slicing arm 172 is moved vertically by means of a motor 161 with aid of the gearbox 162, which raises and lowers the slicing arm base 170. The lower timing pulley 163 is fixed on the gearbox 162, directly rotating the timing belt 165 and upper timing pulley 171. The motor 161 and gearbox 162 are affixed to base 178. The two vertical motion guides 166 are affixed to the lower fixing base 167 from below and the upper fixing base 177 from above, thus supporting the upper timing pulley 171.

The slicing arm base 170 slides vertically on the vertical motion guides 166 by the slide bearings 168, which are affixed by retaining rings 169. The timing belt 165 attaches to the slicing arm base 170 to transfer the motion from motor 161, thereby providing the required vertical motion. The slicing arm 172 is affixed to the slicing arm base 170. The lower safety switch 174 determines the bottom stop location of the arm while the upper safety switch 175 determines the upper stop location of the arm in case of error. The vertical motion assembly of the arm is covered by a cover 173. The slicing arm 172 is horizontally rotated by use of a friction clutch Mechanism, which rotates the slicing arm toward the Shawarma cone 100 during the slicing process. The mechanism continuously rotates the slicing arm 172 even when the arm collides with the Shawarma cone 100, specifically contacting the cone with the buffer 197. This rotational movement makes the slicing arm 172 follow the shape of Shawarma cone 100 and ensures the slicing beveled blade 194 continually follows the varying surface contours of the Shawarma cone 100. It also imparts a light pressure to the slicing arm 172, helping the slicing process simulate natural hand pressure.

The friction clutch mechanism comprises the slicing arm rotation motor 151 and gearbox 152 that is affixed to the lower disc 153 of the friction clutch. The upper disc 154 is affixed on its upper surface to the slicing arm fixing base 178, while the lower surface of the upper disc 154 is affixed to bolt joint 160. This bolt joint 160 goes through the gearbox 152 using the tube 159. The pressure control nut 155 tightens the spring 157, placed between the two washers 156 and 158. The complete assembly is placed on the bolt joint 160 to control the pressure of the slicing arm 172 on the Shawarma cone 100. The slicing arm rotation motor 151 moves the slicing arm away from the Shawarma cone 100 when the slicing process is completed.

The slicing motor 181 is affixed on the slicing arm 172. The slicing beveled blade 194 is affixed to gear box 189 by blade installation screw 191 using the nut 195. The movement of the slicing motor is transmitted to the slicing blade 194 by keyed receiver 186 and splined shaft 185, through the gearbox 189. The slicing blade 194 is placed inside the blade housing 190. The blade housing 190 is affixed to the gearbox 189, and both are affixed to the slicing arm 172 by installation pin 188 that is inserted into installation slot 183 and fixed by installation screw 184 to make the daily installation and uninstallation process for cleaning easier and faster.

The slicing arm touches the Shawarma cone 100 by buffer 197 that is affixed on blade housing 190 by internal threads 196 inside the buffer 197, and the thickness adjustment screw 192 that is located out of the blade housing 190. The size of the slice slot 193 on the blade housing 190 determines the thickness of the slice. The size of the slice slot 193 can by adjusted by rotating the buffer 197 using the internal threads 196 and the thickness adjustment screw 192. As the slice slot 193 becomes larger, the slices become thicker.

Description of Roasted Grilled Shawarma, Gyros and Doner Kebab Meat Slicing Steps As mentioned above, the disclosed invention slices the Shawarma cone 100 helically from top to bottom. This way of slicing has the advantage of reducing the slicing time in comparison with the traditional way and as disclosed in the prior art. Slicing a Shawarma cone vertically from top to bottom requires the cone to be rotated slightly to reach each successive slice. To remove the whole surface of the well-done Shawarma cone requires many iterations of vertical slicing and rotating, which adds considerably to the time required to slice the entire cone. In the disclosed invention the slicing component 150 moves from top to bottom in a single pass at a defined speed proportionate with the rotation speed of the spindle 111 that carries the Shawarma cone 100. In this way, the slicing blade 194 passes over the entire surface of the Shawarma cone 100, thus reducing the slicing time considerably.

After the roasting and smoking step, slicing of the Shawarma cone starts. Slicing of grilled Shawarma starts by two ways; either by an automatic order or by a manual order from the operator 223. When done automatically the slicing orders are pre-programmed within the automatic control unit 116 and executed automatically without any human interference.

The grills 102 go back by the horizontal moving mechanism 106, and grill temperature is lowered to the minimum. Then the rotation motor 114 of the Shawarma cone 100 will stop.

The motor 161, which moves the arm vertically, raises the base carrying the slicing arm base 170 up to the level of the Shawarma cone 100 top defined previously by the operator 223.

Spindle 111 rotating by motor 114 will run at a speed, which is coordinated with the speed of the motor 161 which is lowering the slicing arm. This speed is typically faster than the speed which is used while Shawarma grilling.

The base carrying the slicing arm base 170 is rotated by the slicing arm rotating motor 151 in the direction of Shawarma cone 100, until touching the meat surface and pushing a little. At the same time slicing motor 181 will run to start rotating the slicing blade 194.

The slicing component 150 will be lowered by motor 161 to start slicing. When the slicing component 150 reaches the lower level of the Shawarma cone 100 the base carrying the slicing arm base 170 will stop and the motor 151 will move and rotate the slicing arm away from the Shawarma cone 100. In this fashion, the cutting and slicing will finish and the grilling and smoking step will start again.

While slicing, the Shawarma slices 128 will drop to roasted Shawarma stores 240 and 261 through the opening 117 to be stored at a proper holding temperature until being weighed and then fed into the sandwich or meal in a predetermined quantity.

Operation of the Sandwiches and Meals Assembly Mechanisms:

The lower part of the machine comes in two different models. Model A that lower part 2000 combined with the upper part 1000 can be used in restaurants and another that need man to charge to operate it and take care of it. Model B 3000 comes separate without the upper part 1000 to sell the machine Shawarma sandwiches and meals directly to customers in gathering areas (airports, universities, schools, offices, malls, etc.) by adding the credit card mechanism 280 and the ordering screen 286 without man of charge to accept the orders. In Model B 3000 smoked, half grilled, sliced and refrigerated Shawarma slices used and add it to Shawarma meat storages 240 and 261 and then heated by heater 293 when it needs to add to the sandwiches and meal.

In model A the lower part of the machine 2000 is enclosed by the horizontal swing door 132 and sliding doors 133 which are optionally made of transparent material to display the filling and packing process of the sandwich to customers. The lower part of the machine has a conveying belt 134 and stores 240, 261, 262, 263, and 264 with the components required to prepare, fill, roll, pack, print the order details and sandwich ingredients, and heat the sandwich.

Referring back to FIG. 3B, the machine has front and back sliding doors that easily open to allow refilling the different materials stores. The doors in front may be made out of transparent material so as to show the sandwich and meal filling, warping and packing process to customers, to give them confidence in the process and satisfaction. Cameras 278 can by add it to the machine that transfer the assembly working steps to a screen 286 to show all that steps to the customer as a fun show and to give them confidence and satisfaction. Conveying motor 135 runs the conveying belt, which stops the conveying belt in predetermined positions as detected by the conveying belt sensor 136. The kind of bread selected by the customer (in the example apparatus, either flat bread from the flat bread dispenser 225 or roll bread from the roll bread dispenser 210) is placed on the conveying belt to make sandwiches (subs and wraps) or plate may add it from the plate dispenser 283 to conveying belt as customer desire to make a meal. Next, the filling components are added as required to fulfill the customer's order, as entered into the machine by the operator 223 or the customer using the control touch screen 123, 286 or internet.

Figure 9:
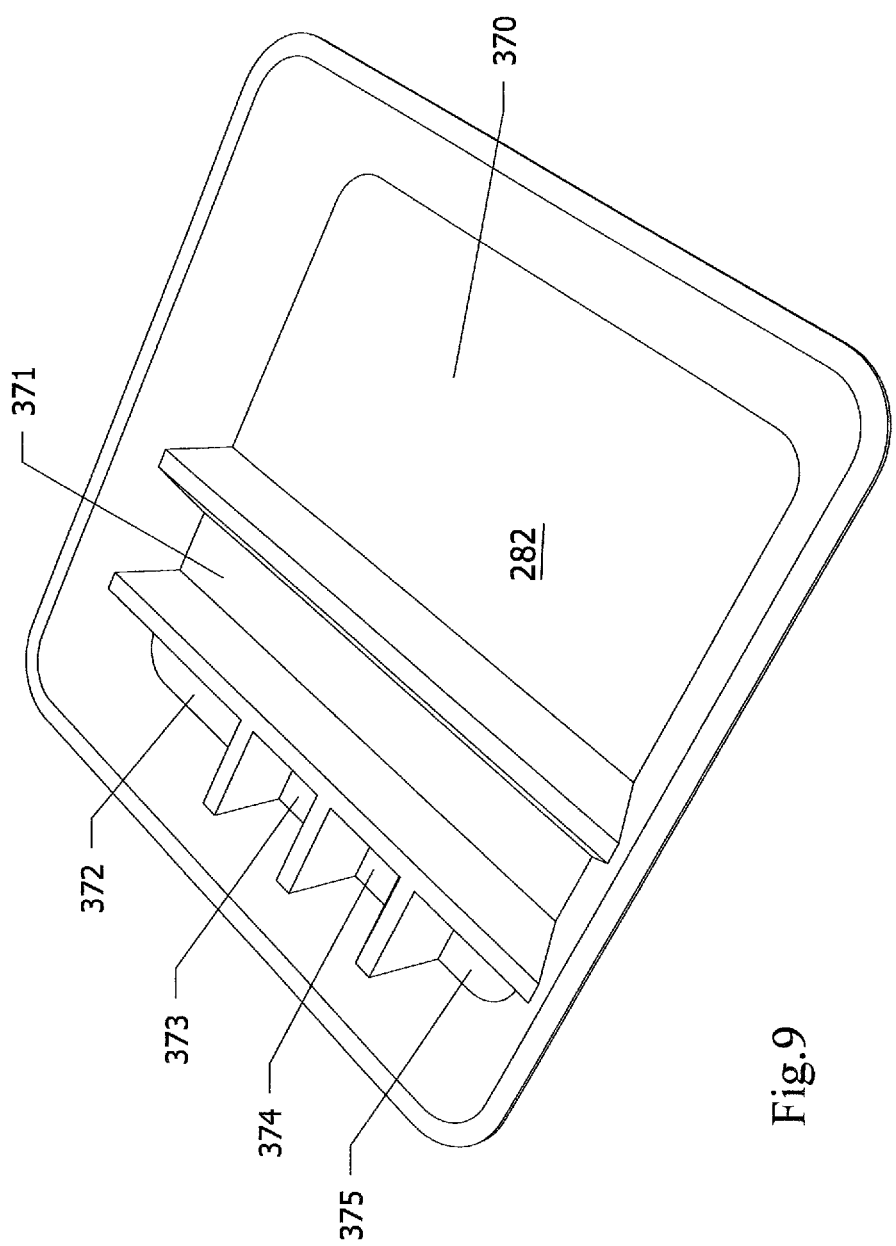
FIG. 9 is perspective view of a plate divided into different sections of an apparatus for preparing Shawarma sandwiches and meals.

After putting a piece of the chosen bread type or meal's plate 282 on the conveying belt, the conveying belt moves the bread piece or plate under each respective materials distribution component for filling. The chosen bread type can be add it also to the meal's plate 282 as customer desire then the other material can be add it to the bread piece that already located in the meal's plate 282 to make a Shawarma meal. The plate divided into many different sections 370, 375, that contain the selected type of bread and the Shawarma meat. The sections 371, 372 contains salad. The sections 373, 374 and 375 contain mayonnaise and different kinds of sauces, to avoid mix the different materials and ingredients together as shown in FIG. 9. With reference to FIGS. 14A, 14B and 14C, examples of such components provided in the figures include a mayonnaise dropping head 267, different sauces dropping head for plate 281, tomatoes slicing component 200, weighing and distribution component of pickles 262, weighing and distribution of a first roasted Shawarma type from store 240, a first type of sauce dropping head 274, weighing and distribution component of a first salad type from store 263, weighing and distribution of a second roasted Shawarma type from store 261, a second type of sauce dropping head 275, and a weighing and distribution component of a second salad type from store 264.

During this process, the laying and printing of rolling paper component 340 prepares the packing paper (described below) and prints all the information on it to be ready for rolling, packing and heating of the sandwich. Once the sandwich is filled with all the required materials per the customer's selections, it goes to wrapping, packing and heating component 300. When the sandwich is ready it leaves the machine by sandwich exit 131. The plate of the meal moves on this mechanism to the exit through a convey belt.

Figure 8:
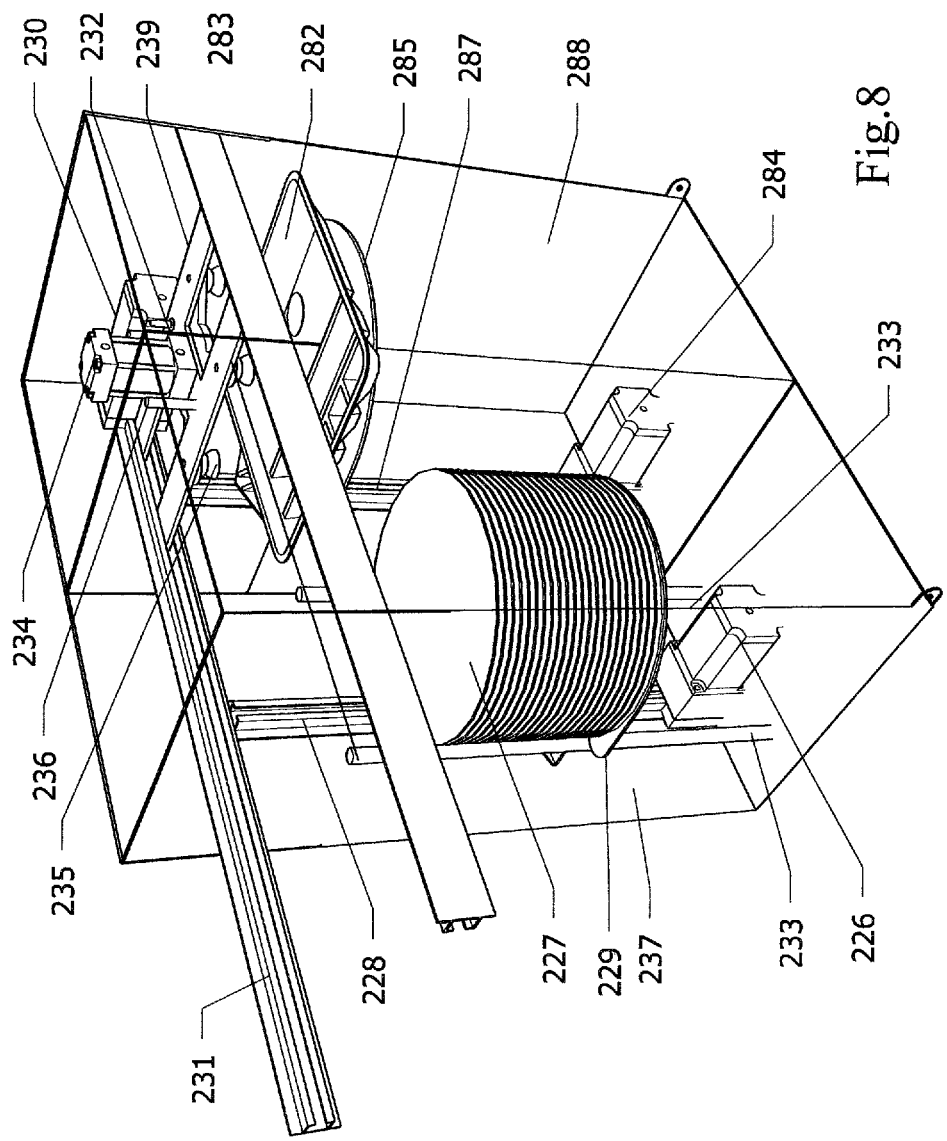
FIG. 8 is a perspective view of a plate and flatbread dispenser of an apparatus for preparing Shawarma sandwiches and meals.

With reference to FIGS. 8 and 9, an example of the flatbread dispenser device 225 and a plate dispenser 283 will now be described. The plate comes divided shape to contains differ type of materials. The large space divide contains the bread piece and Shawarma meat, the other sections contain the salads and different kind of sauces. The meal's plate 282 is put in the shelf 285 within the plate store 288. This shelf moves vertically on a vertical rail 287 by motor 284 within plate store 288. When the shelf reaches the upper limit, it stopped by sensor 232. The moving vacuum base 239 carries the vacuum heads 235 and the vertically moving piston 234. This piston goes up and down on a vertical axis 236, carrying the vacuum heads 235. When required to put the meal's plate 282 onto the conveying belt 134 to start filling it as a meal, the piston 234 goes down vertically to the plate level on the shelf 285. The vacuum heads 235 are actuated, removing the topmost piece of meal's plate 282 from the shelf 285. The piston 234 retracts up vertically, and then moves horizontally to put the meal's plate 282 on the conveying belt 134. The horizontal motion is provided by a motor 230, which moves the movable vacuum base 239 on a horizontal rail 231.

The flatbread can be any type of bread suitable to preparation of a Gyros, Shawarma and Doner Kebab sandwich, such as pita bread or Tortilla. The flatbreads 227 are put in the shelf 229 within the flatbread store 237. This shelf moves vertically on a vertical rail 228 by motor 226 within the flatbread store 237. When the shelf reaches the upper limit, it is stopped by a sensor 232. The moving vacuum base 239 carries the vacuum heads 235 and the vertically moving piston 234. This piston goes up and down on a vertical axis 236, carrying the vacuum heads 235. When required to put the flatbread 227 onto the conveying belt 134 to start filling it as a sandwich, the piston 234 goes down vertically to the flatbread level on the shelf 229. The vacuum heads 235 are actuated, removing the topmost piece of flatbread 227 from the shelf 229. The piston 234 retracts up vertically, and then moves horizontally to put the bread on the conveying belt 134. The horizontal motion is provided by a motor 230, which moves the movable vacuum base 239 on a horizontal rail 231. The flatbreads 227 are held in correct position by leading axis 233 in the bread shelf 229 within the flat bread store 237.

Figure 10:
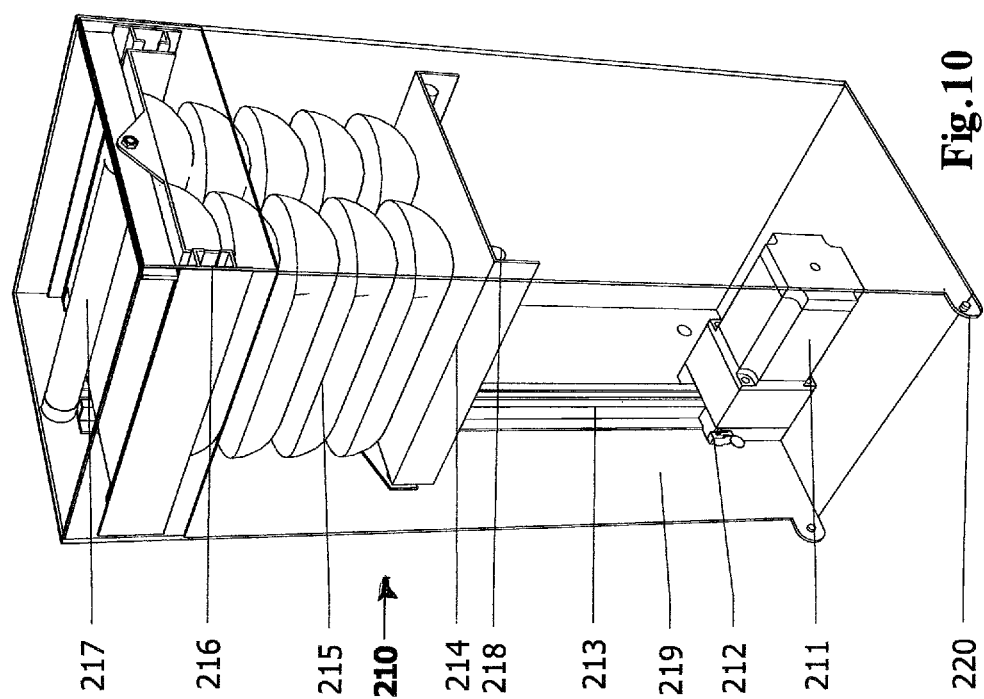
FIG. 10 is a perspective view of a roll bread dispenser of an apparatus for preparing Shawarma sandwiches and meals.
Figure 11:
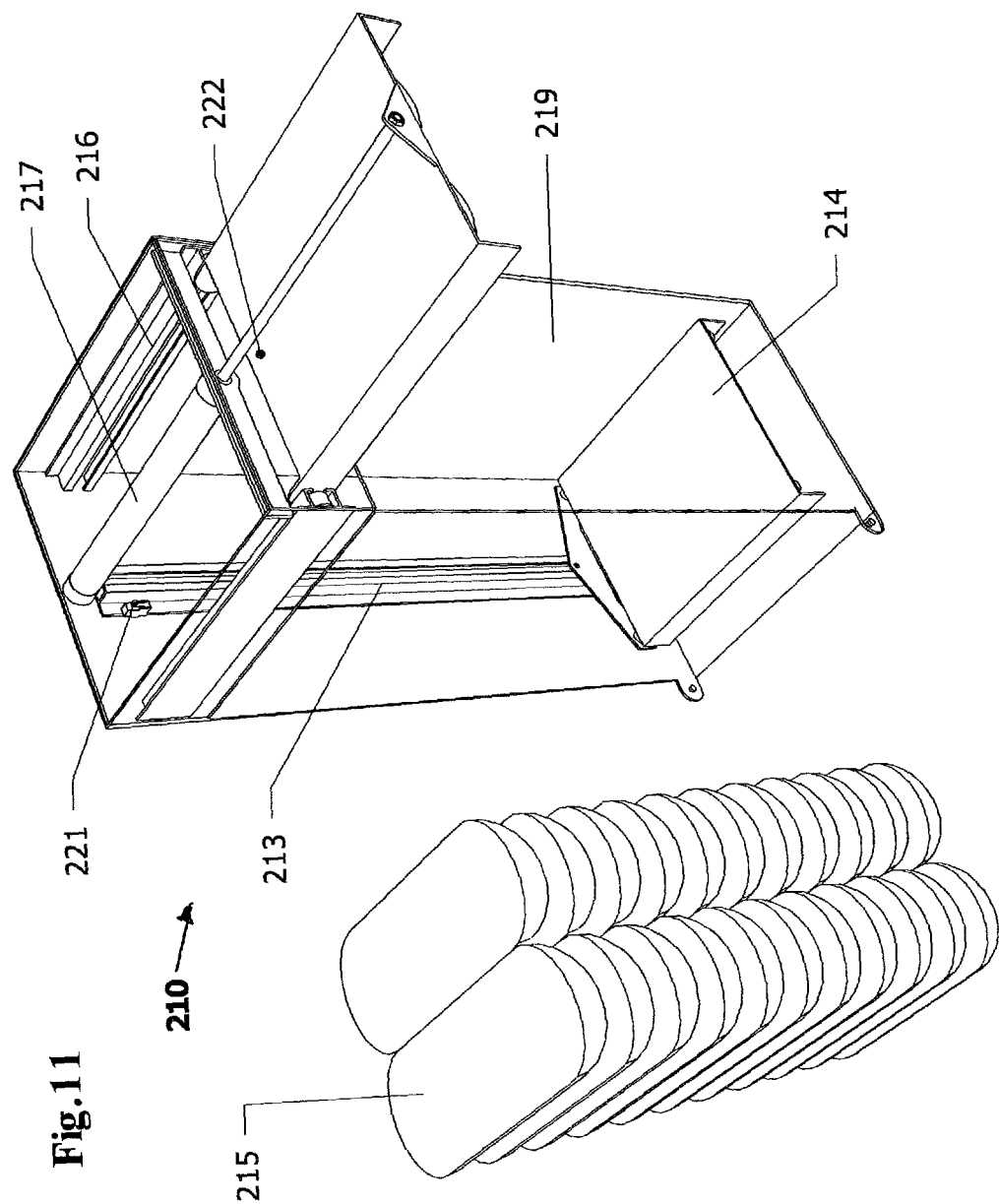
FIG. 11 is an exploded perspective view of a roll bread dispenser with a roll bread stack removed to illustrate structure underneath thereof of an apparatus for preparing Shawarma sandwiches and meals.

With reference to FIGS. 10 and 11, an example of the roll bread dispenser 210 will now be described. The bread is sliced into two halves, but still remain connected on adjacent edges thereof. The roll breads 215 are stored within roll breads store 219 on a shelf 214. This shelf is carried by two arms 218. The shelf 214 moves vertically within the roll breads store 219 on a vertical rail 213 by the motor 211. When reaching the upper limit the shelf stops by the sensor 221. When required to put roll bread 215 on the conveying belt 134, the pushing piston 217 affixed to enclosure 222 moves the enclosure 222 horizontally on horizontal rail 216 to place the roll bread 215 on the conveying belt 134, to start filling it as a sandwich. When the roll breads store 219 becomes empty it can be refilled once the shelf 214 goes down and stops by sensor 212.

Figure 12:
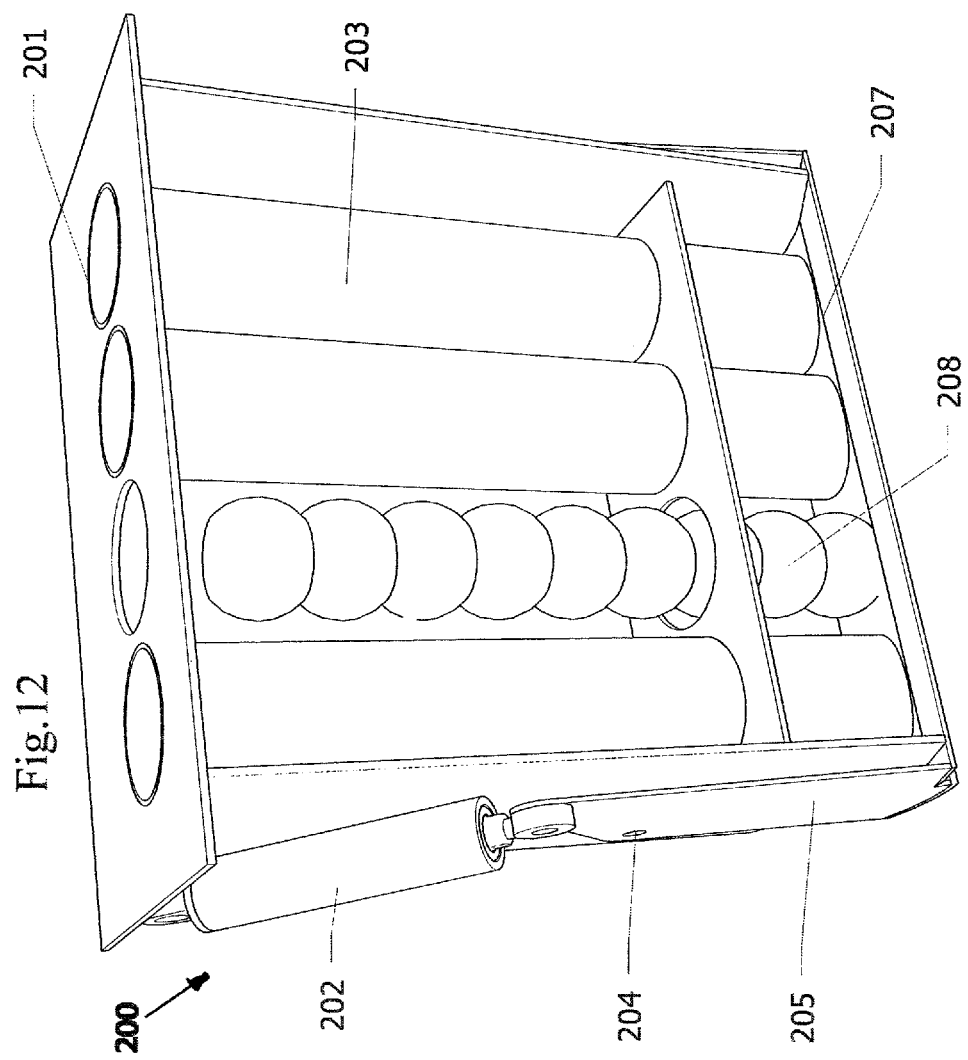
FIG. 12 is a perspective view of the tomato slicing device of an apparatus for preparing Shawarma sandwiches and meals.
Figure 13:
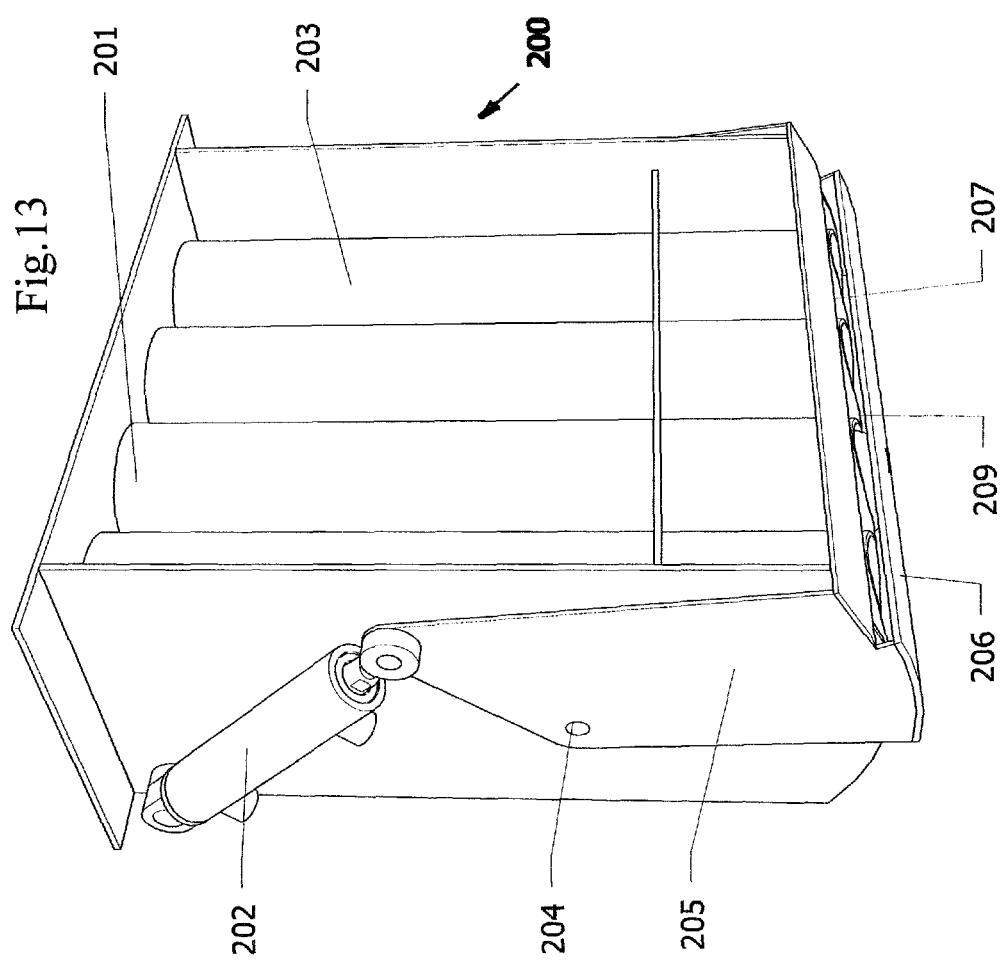
FIG. 13 is a bottom perspective view of a tomato slicing device of an apparatus for preparing Shawarma sandwiches and meals.
Figure 15:
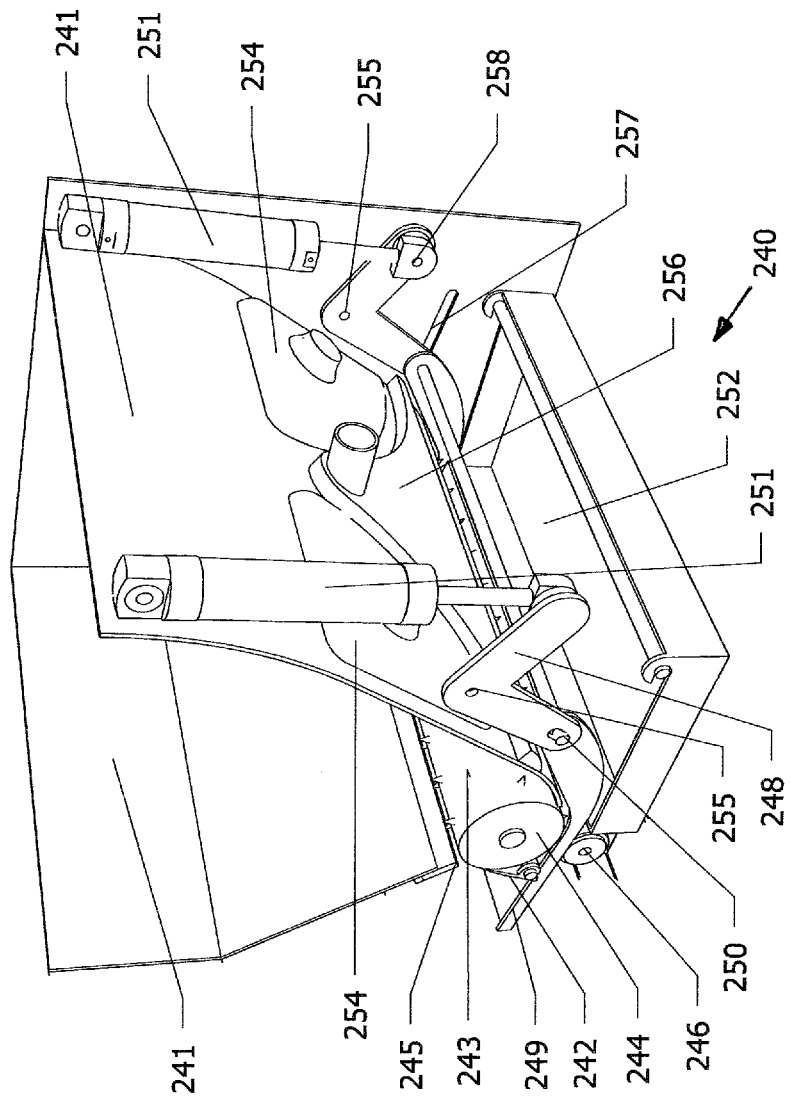
FIG. 15 is a right side perspective view of an ingredient storage of an apparatus for preparing Shawarma sandwiches and meals with actuators extended.
Figure 16:
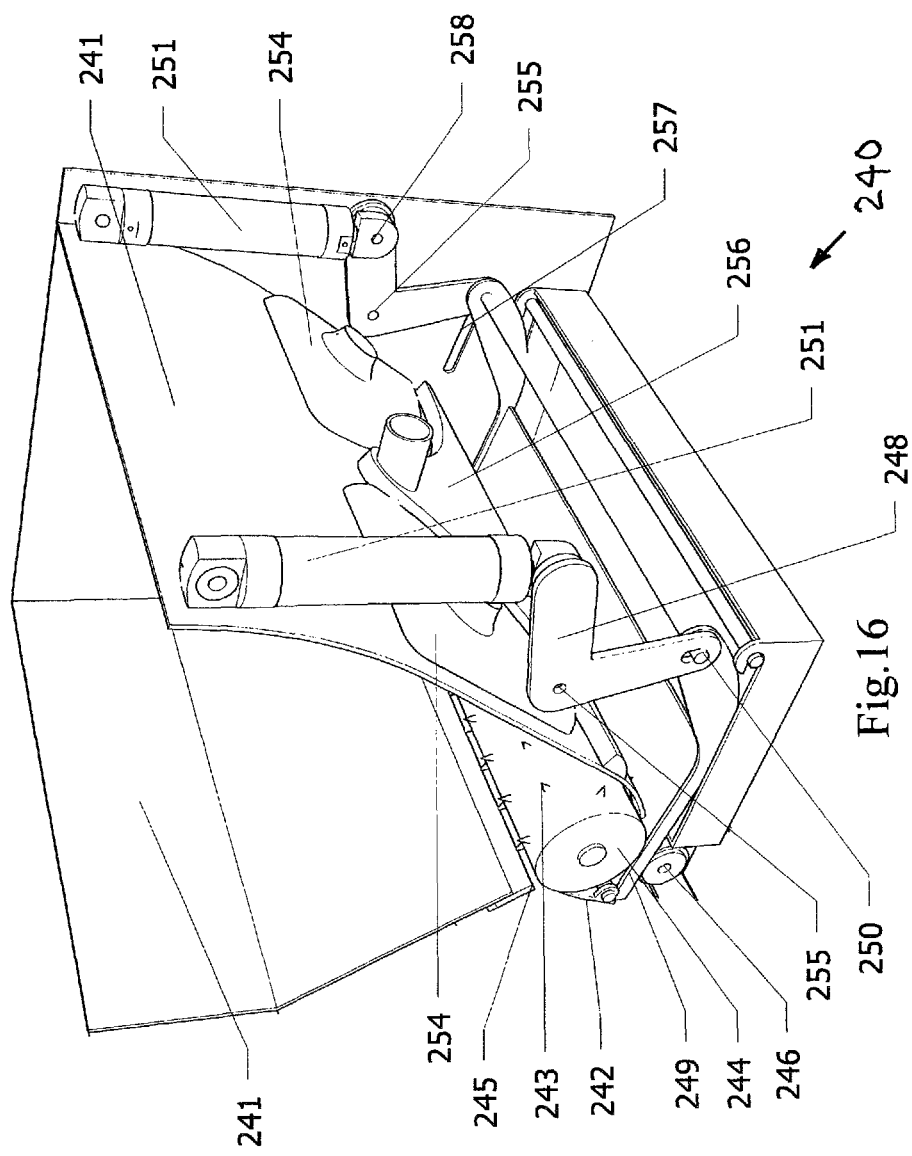
FIG. 16 is a right side perspective view of an ingredient storage of an apparatus for preparing Shawarma sandwiches and meals with actuators refracted.
Figure 17B:
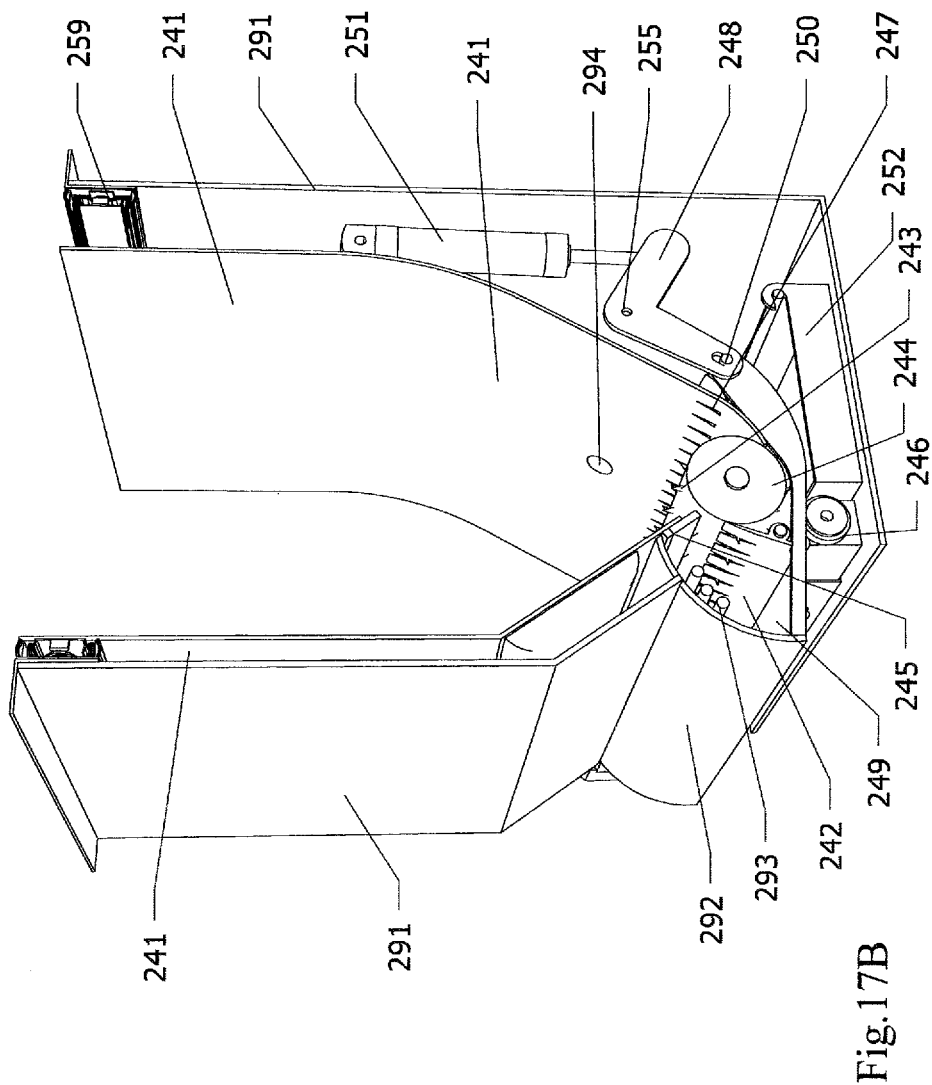
FIG. 17B is a perspective view of an ingredient store of a second embodiment of an apparatus for preparing Shawarma sandwiches and meals for selling directly to customers.

With reference to FIGS. 12 and 13, an example of the tomato slicing device 200 will now be described. Tomato pieces 208 are inserted within pipes 203 from opening 201 at the top. The tomato pieces 208 are prepared by removing each whole tomato's top and bottom before insertion within the pipes to ensure uniform tomato slices. The tomato pieces are sliced when piston 202 moves the slicing arm 205 that is affixed to the tomato slicing component 200 on a rotating axis 204. Attached to the end of the slicing arm 205 are guillotine shear 207 and barrier 206. As the piston 202 moves the slicing arm 205, the guillotine shear 207 cuts the tomato pieces 208 into slices, which then drop through slot 209 onto the sandwich located under the tomato slicing component 200. After slicing, piston 202 returns the slicing arm 205 to its starting location, which moves barrier 206 to its initial location, thereby preventing tomato pieces 208 from falling out of the tomato slicing component 200.

With reference to FIGS. 3A, 3B and 14A-14C, the liquid component storage parts will now be described. Liquid condiments requiring cold storage, such as mayonnaise, are stored within in a special store 265 within a refrigerator 266 to avoid spoilage. In the current example apparatus, the liquid mayonnaise is conveyed to a mayonnaise dropping head 267 through a pipe 276 by pump 272 located at the bottom of the store. Other liquid materials (such as different sauces) are stored within stores 268, 269, 270 and 271 where these materials are conveyed by pumps 272 that are located on each store through the different pipes 273 to dropping heads 274, 281 and 275, located at appropriate locations on the conveying belt 134 to feed the required condiment quantity to the sandwich or meal. These stores are installed on sliding rails 259 to allow for easy filling and cleaning. The stores have an empty system to inform when the store are near the empty from the material.

With reference to FIGS. 15, 16, 17A and 17B, an example of an ingredient store 240 will now be described. Examples of stored materials include Shawarma slices, salads (that may include cabbage, lettuce, onion and parsley), cubed pickles, and cubed French fries. The components of an example ingredient store 240 comprise a hopper 241 having a cylinder 244 at the bottom carrying prongs 243. When rotating, the cylinder 244 catches the material in hopper 241 with its prongs 243, and pulls it down. A brush 245 located on the front wall of hopper 241 above the cylinder 244 retains the remaining materials in the hopper 241. The cylinder 244 is rotated by the cylinder motor 253 (see FIG. 2A).

During cylinder 244 rotation, the materials carried by the prongs 243 are released by a comb 242, exit from the store, and are dropped and collected on the collection shelf 249. The collection shelf 249 is located on a scale 246. Once the required weight is achieved the cylinder stops and the collection shelf 249 moves back to let the material drop in the sandwich located under the component. The collection shelf 249 moves back on rail 257 by actuator 251. This actuator 251 is connected to the collection shelf 249 by the hinge 250 and the arm 248 through hinges 255 and 258. The liquids collected from these materials are stored within a drawer 252.

If needed, heaters 254 can be attached to the walls of the hopper 241 to maintain a temperature suitable for storage of roasted Shawarma slices or any other material that ideally should be kept warm. Similarly, a cooling or refrigeration means can be added in place of heater 254 for materials that ideally should be kept cool. Smoked air can optionally by pumped through pipes 260 to a smoked air duct 256, which in turn feeds smoked air vent 247, located in the wall of the hopper 241 for further smoking of the stored grilled Shawarma slices. These components slide on rails 259 for easy removal to facilitate filling and daily cleaning. In model B 3000 smoked, half grilled, sliced and refrigerated Shawarma slices used and add it to Shawarma meat storages 240 and 261. Refrigeration or cooling mechanism 291 add it to the store wall 241 to keep the slices in suitable temperature. When the Shawarma slices need to add to the sandwiches or meal it heated by the heater 293 that covered by cover 292. Empty sensor 294 add it to the ingredients storages walls of the ingredients storage 241, 262, 263, 264, 269, 268, 266, 271 and 272 to make a sing to the operation system when the storages empty of ingredients to refill it immediately.

Figure 18:
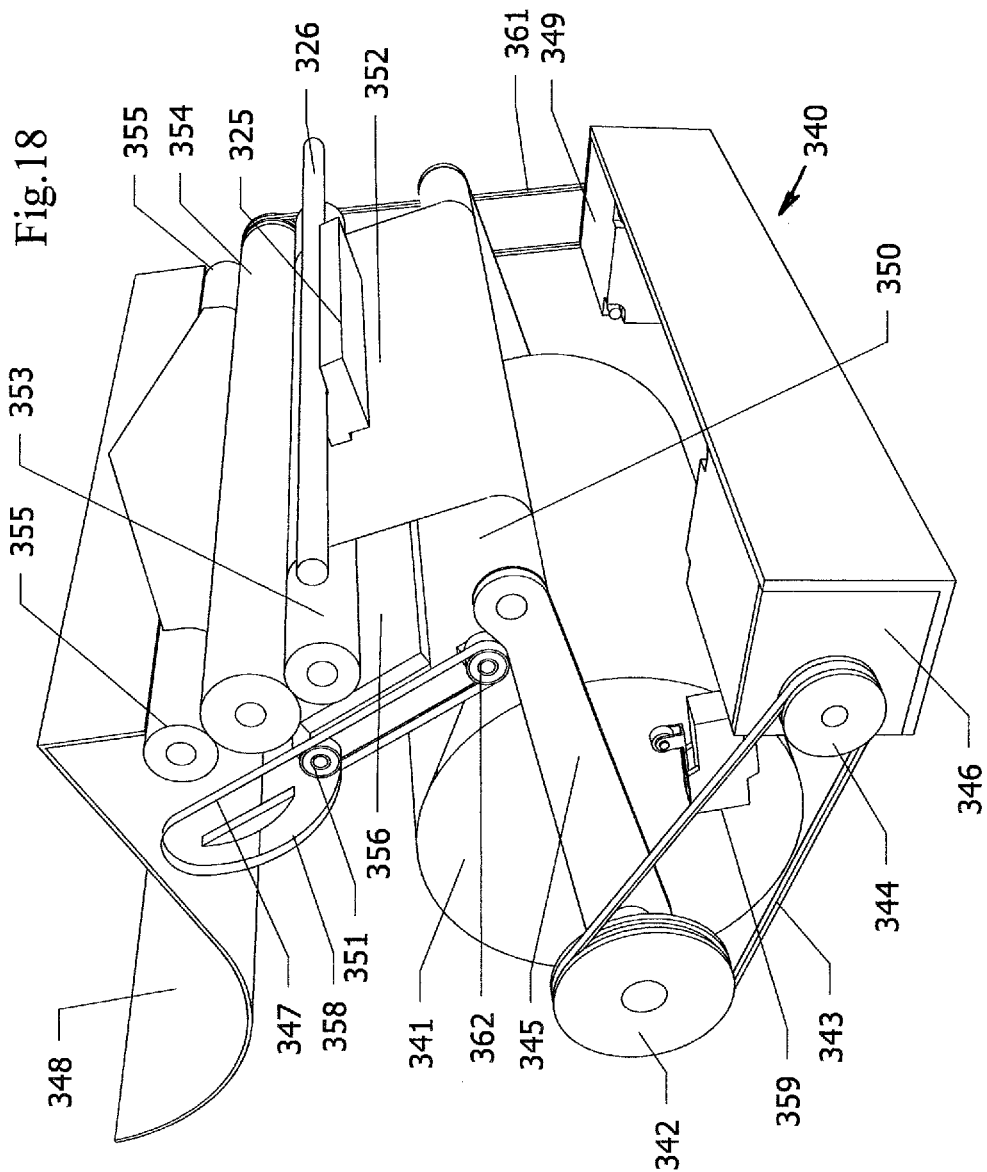
FIG. 18 is a perspective view of an assembly for unrolling, cutting, and printing sandwich wrapping paper of an apparatus for preparing Shawarma sandwiches and meals.
Figure 19:
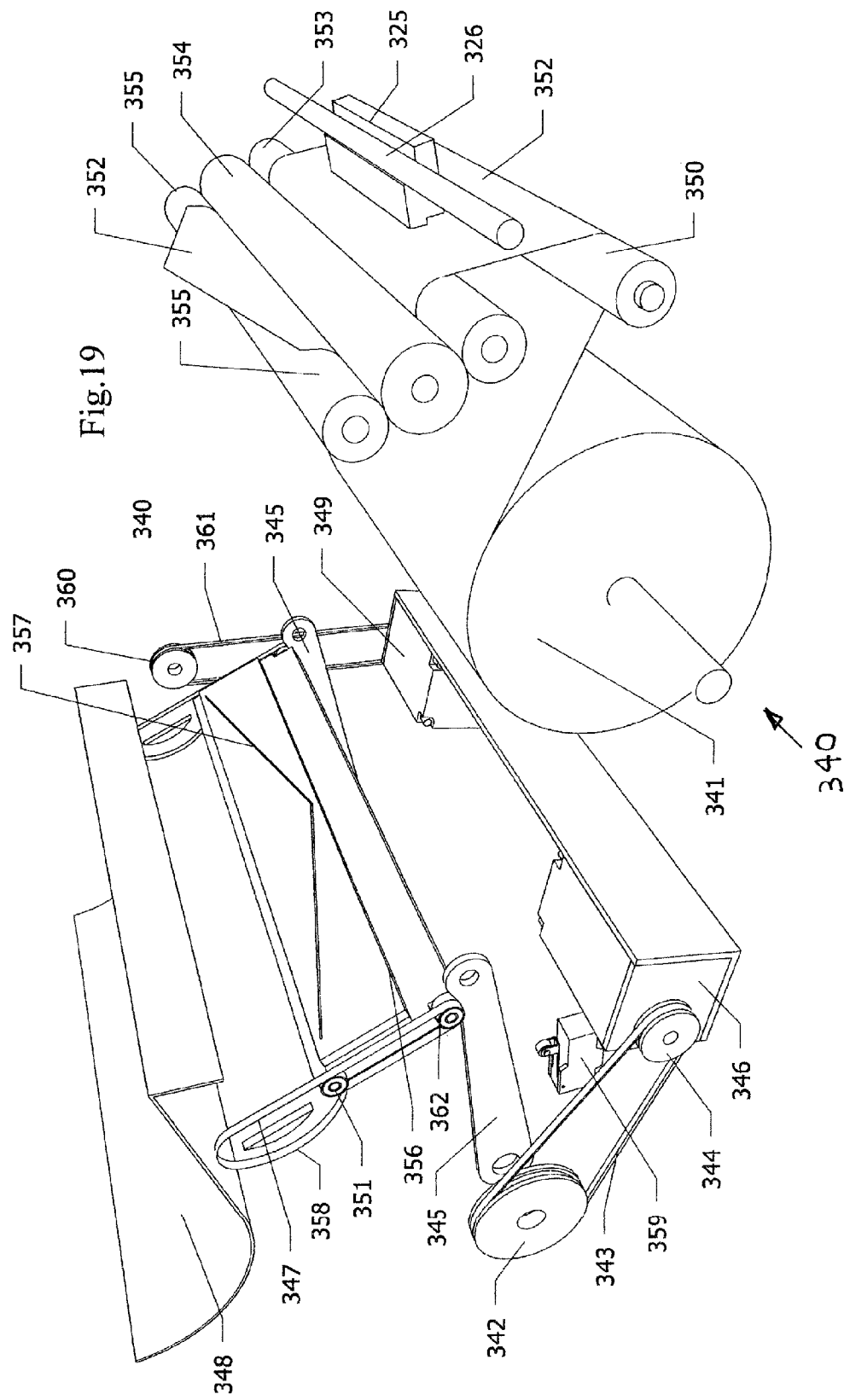
FIG. 19 is an exploded perspective view of an assembly for unrolling, cutting, and printing sandwich wrapping paper of an apparatus for preparing Shawarma sandwiches and meals.

The Packing, Wrapping and Heating Components:

With reference to FIGS. 18 and 19, an example of an apparatus for unrolling, cutting and printing of packing paper 340 will now be described, This component prepares the rolling paper 352 by unrolling, cutting and printing the components and quantities of the prepared sandwiches and the order number. The example apparatus comprises a packing paper roll 341, which is rotated by motor 346 via pulleys 342 and 344, connected by timing belt 343. As the packing paper roll 341 rotates, the rolling paper 352 is unrolled while it is sized to the required length. Sizing is accomplished by length sizing cylinder 350, carried by sizing arm 345, which moves down by gravity. When the sizing arm 345 reach the sensor 359, the rotation of paper roll 341 is stopped by stopping the motor 346. An actuator 349 is linked to pulleys 360 and timing belt 361 to rotate the pulling cylinder 354, which pulls the sized packing paper 352 in conjunction with cylinders 355 and 353, as the packing paper 352 is threaded between the three cylinders. A notching blade 357 is affixed on the notching blade holder 356, which is equipped with lower bearings 362 on each side that run along and are carried by the sizing arm 345. When the packing paper 352 is pulled by the rotation of pulling cylinder 354, the sizing arm 345 moves up and simultaneously causes the notch blade holder 356 to move. As its movement continues, the packing paper 352 engages the notching blade 357, and is cut to the required size. The notch blade holder 356 movements are controlled by the travel of upper bearing 351 on each side, which moves up into raising rail 347 and moves down into dropping rail 358 after cutting the packing paper. It will be understood by a person skilled in the field applicable to the disclosed invention that foil or another suitable material may be substituted for the packing paper. The printing step of the all components and the quantity that are included in each sandwich in an order is done by the printing head 325, which is affixed on an axis 326.

Figure 20:
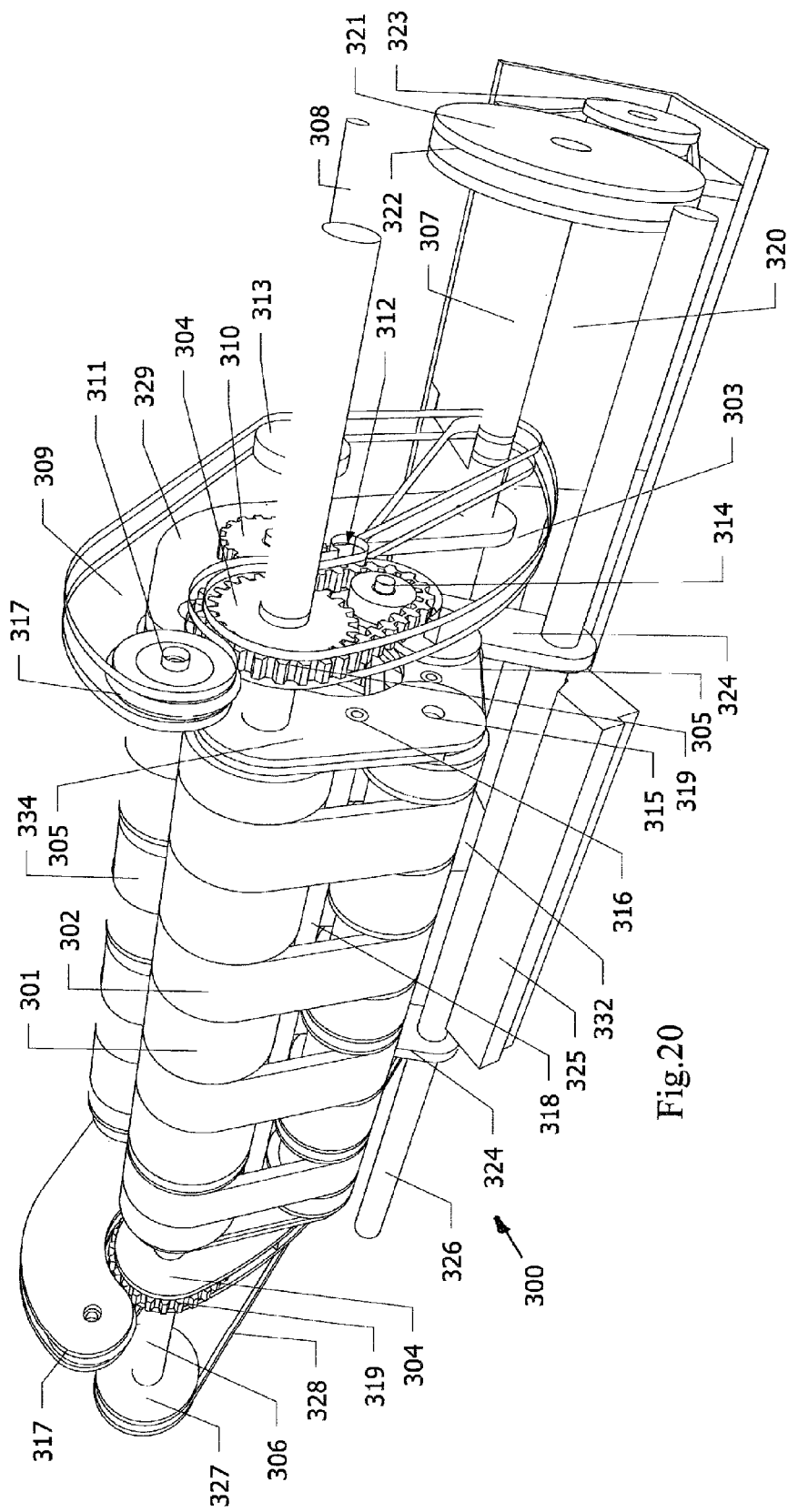
FIG. 20 is a perspective view of an apparatus for sandwich wrapping, heating and packing of apparatus for preparing Shawarma sandwiches and meals with a wrapping mat in a closed position.
Figure 21:
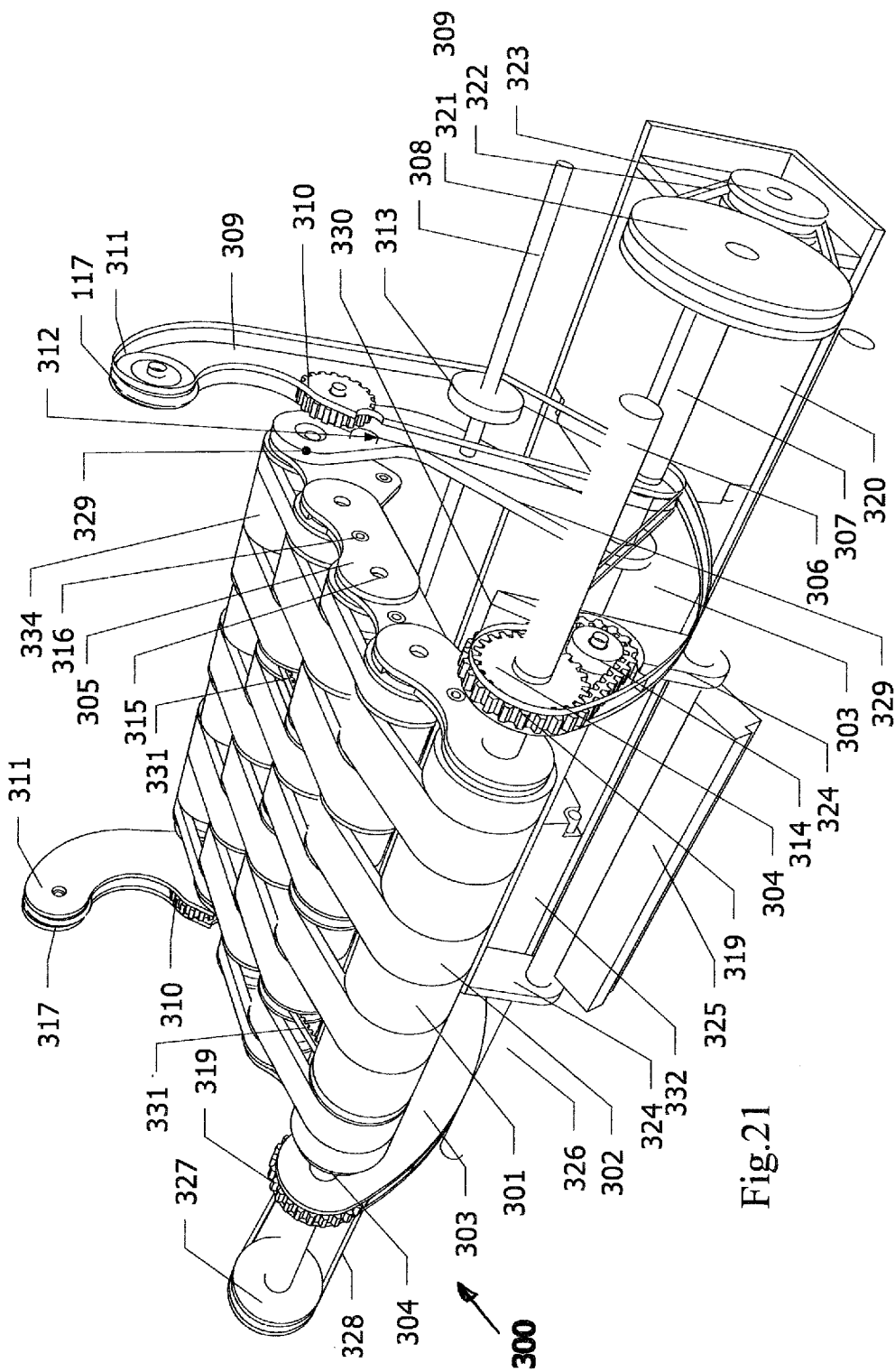
FIG. 21 is a perspective view of an apparatus for sandwich wrapping, heating and packing of an apparatus for preparing Shawarma sandwiches and meals with a wrapping mat in an open position.

With reference to FIGS. 20 and 21, an example of an apparatus for sandwich wrapping, heating and packing 300 will now be described. The wrapping component comprises a wrapping mat placed around several cylinders, which are connected to each other by joint plates 305, affixed on sides of the cylinders by hinges 315. The joint plates 305 are connected to each other by linking axes 318 through the points 316. There are recesses in the surface of the cylinders that have the same thickness of the round belts 302, which are comprised of rubber, silicone, or a similar suitable material. The round belts 302 comprise the wrapping mat. The motor 332 imparts clockwise and counterclockwise rotation movement to the primary cylinder 301 in the mat by way of belt 328 and pulley 327 located on the primary axis 306. The timing belts 331 transfer the rotational movement from primary cylinder 301 to the other mat cylinders and to the round belts 302. While timing belts are an effective means to transfer rotational torque from the primary cylinder 301 to the other mat cylinders, the round belts 302 can also serve this purpose of rotational movement transfer in implementations where torque amounts and tensions permit. The process of wrapping, packing, and heating occurs in two steps: In the first step, wrapping, the completed sandwich is moved by the conveying belt 134 to the starting location on the wrapping mat, as detected by sensor 333. The cylinders and round belts 302 rotate to pull the packing paper and sandwich onto the wrapping mat. The primary cylinder 301 remains in a fixed location on the mat, while cylinder 334 moves because of its connection to the two moving arms 329 that are linked together by fixing axes 308. The motor 320 has two rotational directions, and imparts rotation to axis 307 by way of belt 322 and pulleys 323 and 321. Axis 307 in turn imparts rotation to the two moving arms 329, fixed sealing arms 303, and sealing arms 309. As axis 307 is rotated, the mat cylinders open and close on each other, accomplishing the wrapping and packing process. A sandwich on the wrapping mat is wrapped and packed as the aforementioned arms and cylinders close the mat around the sandwich, forming a semi-cylindrical shape similar to the sandwich shape.

A completed sandwich with all the different components requested by the customer moves from the conveying belt 134 to the wrapping mat, which has a flat position, and is stopped in a specific location as detected by sensor 333. The plate that have a meal pass over a wrapping mat and use it a convoying belt to the exit area. The wrapping and packing process starts when the mat is closed by moving arms 329, thus surrounding the sandwich. The sandwich with the different components is thus located in a semi-cylindrical cavity formed inside the mat and cylinders. The packing paper is introduced to the wrapping mat from outside the mat. The cylinders and the round belts 302 start rotating to pull the packing paper around the sandwich, wrapping it. The sandwich can be heated during this step by an electromagnetic heater 330 that carried by the heater carrying arm 324 affixed to the axis 326.

The components for sealing the packing paper comprise rotating sealing arms 309 and fixed sealing arms 303. There are shims 313 between the rotating sealing arms 309. Axis 308 links the two rotating sealing arms 309 and the two moving arms 329 that are rotated by axis 307. When axis 307 rotates, the rotating sealing arms 309 close on the fixed sealing arms 303 or open, depending on the rotation direction. The rotating sealing arms 309 hold inserting wheels 311 that are covered by rubber covers 317, that aid in the insertion of the wrapping paper into the wrapping mat, as well as the inserting timing pulley 310. The fixed sealing arms 303 carry the timing pulley 304 and the wheel 314 that give rotational movement to the double sided timing belt 319 that inserts the packing paper into the packing paper inserting slot 312 by interlocking with inserting timing pulley 310. The packing paper sealing mechanism is engaged by the double sided timing belt 319 coming into contact with the inserting timing pulley 310 into the paper inserting slot 312 when the rotating sealing arms 309 are closed on the fixed sealing arms 303.

In the wrapping process, the wrapping paper is normally centered on the wrapping mat resulting in the sandwich being placed in the center of the wrapping paper and the paper being sealed on each end of the sandwich, fully wrapping and enclosing the sandwich. Alternatively, if selected by a customer or an operator, the wrapping paper can be offset off the end of the wrapping mat, thereby placing the sandwich so that one end is uncovered, the wrapping paper is only sealed on one end, and the sandwich is left with one end unwrapped. This configuration is ideal when the customer wishes to immediately consume the sandwich, as the wrapping paper provides a convenient means to neatly hold the sandwich and its contents.

Machine Mobile Truck

Figure 22:
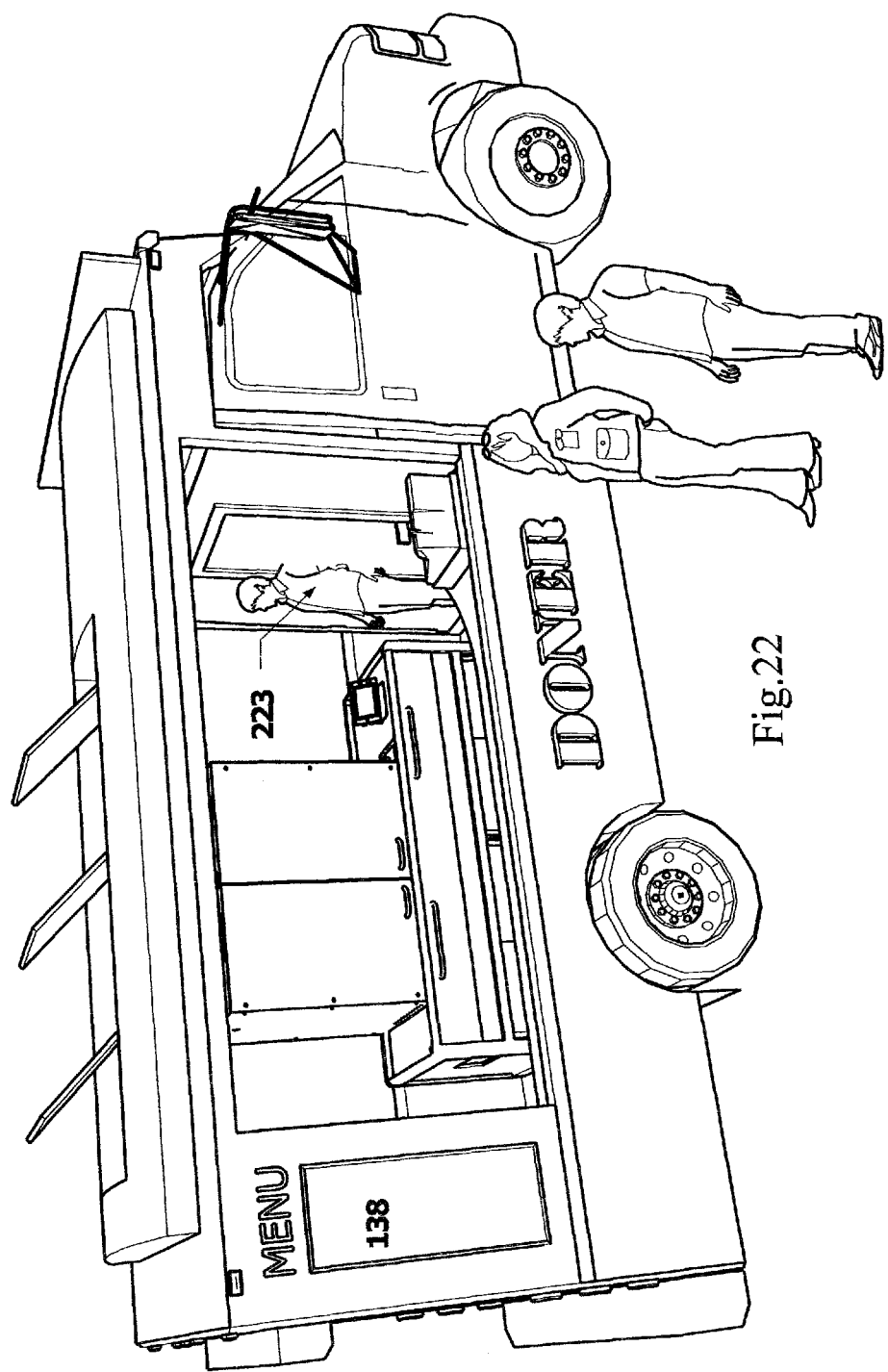
FIG. 22 is a perspective view of a mobile truck for retaining an apparatus for preparing Shawarma sandwiches and meals.

With reference to FIG. 22, an example of a mobile truck implementation of the disclosed invention will be described. In addition to installing the disclosed invention in fast food restaurants it can be mounted in a mobile truck 138 having the necessary utilities (e.g., electricity, cooking gas and water) in order to increase sales points and availability of Shawarma sandwiches and meals in temporary gathering areas, e.g. shows, universities, public gardens and sea shows. Thus, we increase sales in temporary gathering areas where it is almost impossible economically to have fixed restaurants. The disclosed invention can provide clean, quick and high quality service with minimum unskilled labor and space.

The disclosure above encompasses multiple distinct inventions with independent utility. While each of these inventions has been disclosed in a particular form, the specific embodiments disclosed and illustrated above are not to be considered in a limiting sense, as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

We claim:

1. A method of providing sliced meat comprising:
   providing a rotating vertical spindle for retaining a meat cone;
   slicing a meat cone retained on the vertical spindle to produce a meat slice by operating a slicing mechanism having a slicing arm and a conical slicing wheel disposed on an end of the slicing arm, wherein slicing the meat cone comprises moving the slicing arm horizontally toward the meat cone and slicing the meat cone in a helical pattern by moving the slicing wheel vertically as the meat cone rotates on the vertical spindle;
   wherein a slicing wheel housing contains the slicing wheel and a slicing buffer, wherein the slicing buffer adjustably connects to the slicing wheel housing to define an adjustable slicing opening positioned to expose the slicing wheel so that the slicing wheel engages the meat cone as the meat cone rotates into the slicing wheel, wherein the slicing wheel slices the surface of the meat cone at a thickness, and wherein the slicing buffer can move closer to or away from the slicing wheel to widen or narrow the slicing opening to adjust slicing thickness;

and wherein slicing the meat cone further comprises operating a first motor to move the slicing arm vertically, and operating a friction clutch mechanism to transfer power from a second motor to horizontally move the slicing arm toward or away from the meat cone, and following the contours of the meat cone with the conical slicing wheel by operating the friction clutch mechanism to transfer power from the second motor into the slicing arm to apply the conical slicing wheel into the meat cone.

2. The method of providing sliced meat of claim 1, further comprising smoking the meat cone with a smoking device, the meat cone being retained in an enclosure.

3. A method of preparing sandwiches and meals comprising:
providing a rotating vertical spindle for retaining a meat cone;
slicing a meat cone retained on the vertical spindle to produce a meat slice by operating a slicing mechanism comprising a slicing arm and slicing wheel rotatably disposed on an end of the slicing arm, wherein the slicing arm is configured to horizontally move toward the meat cone, and wherein slicing the meat cone further comprises slicing the meat cone in a helical pattern by using a first motor to move the slicing arm vertically as the meat cone rotates on the vertical spindle;
providing a choice of flat bread or roll bread;
dispensing a flat bread onto a conveying belt or a food plate on the conveying belt, by operating a vacuum head plate to move vertically and to selectively retain the flat bread, and operating a motor to move the vacuum head plate along a rail defining a horizontal path;
dispensing a roll bread by operating a roll bread dispenser comprising a shelf for raising the roll bread vertically to the level of the conveying belt or the food plate on the conveying belt, and operating a pusher mechanism to push the roll bread horizontally onto the conveying belt or the food plate on the conveying belt;
mechanically positioning a meat slice and/or a vegetable on or adjacent to the food plate, the flat bread, or the roll bread by operating a dispenser having prongs and a comb, wherein operating the dispenser comprises using the prongs to pull the meat slice and/or the vegetable from a container and using the comb to release the meat slice and/or vegetable from the prongs to a collection shelf, and further using the collection shelf to release the meat slice and/or vegetable to the flat bread, the roll bread, or the food plate when a predetermined weight is collected by pulling the collection shelf to fulfill an order as requested by a customer for a sandwich or a meal; and
wrapping a sandwich in the order by conveying the sandwich to a wrapping mechanism comprising a plurality of cylinders and round belts, and operating the wrapping mechanism, wherein operating the wrapping mechanism comprises closing at least a portion of the round belts on itself to substantially enclose and create an at least semicylindrical shaped sandwich, introducing a wrapping material into the wrapping mechanism, and rotating the cylinders and round belts to completely encircle at least part of the sandwich with the wrapping material in a substantially cylindrical shape.

4. The method of preparing sandwiches and meals of claim 3, further comprising filling the order through one of a touch screen and a computer and the internet.

5. The method of preparing sandwiches and meals of claim 3, further comprising heating the meat cone with a heater.

6. The method of preparing sandwiches and meals of claim 3, further comprising printing order details on at least one of a piece of wrapping paper and a receipt for a customer.

7. The method of preparing sandwiches and meals of claim 3, further comprising smoking the meat cone with a smoking device.

8. The method of preparing sandwiches and meals of claim 3, further comprising retaining the rotating vertical spindle in an enclosure.

9. The method of preparing sandwiches and meals of claim 8, further comprising locating the vertical spindle, the slicing mechanism, and the bread dispenser in a food truck or a kiosk.

10. The method of preparing sandwiches and meals of claim 3, further comprising providing at least one camera and a monitor for showing a customer the operation of the method of preparing sandwiches and meal.

11. The method of preparing sandwiches and meals of claim 3, further comprising dispensing liquid condiments on to a plate, the flat bread, the bread roll, or the sliced meat with a condiment dispensing apparatus.

12. A method of preparing sandwiches and meals comprising:
filling a customer order through one of a touch screen and the internet;
providing a refrigerated storage device for retaining sliced meat;
providing one of a paper and a food plate;
dispensing a flat bread onto one of a conveying belt and the food plate on the conveying belt with a flat bread dispenser, wherein dispensing the flat bread comprises using a vacuum head plate to move vertically and to selectively retain the flat bread and operating a motor to move the vacuum head plate along a rail defining a horizontal path;
dispensing a roll bread onto the conveying belt or the food plate on the conveying belt with a roll bread dispenser, the roll bread dispenser comprising a shelf for raising the roll bread vertically to the level of the conveying belt or the food plate on the conveying belt, and operating a pusher mechanism to push the roll bread horizontally onto the conveying belt or onto the food plate on the conveying belt;
using a dispenser having prongs and a comb to mechanically position the meat slice from the refrigerated storage device on or adjacent to the food plate, the flat bread, or the roll bread, wherein using the dispenser comprises using the prongs to pull the meat slice from a container and using the comb to release the meat slice from the prongs to a collection shelf, wherein the collection shelf releases the meat slice to the flat bread, the roll bread, or the food plate when a predetermined weight is collected by pulling the collection shelf to fulfill an order as requested by a customer for at least one of a sandwich and a meal;

dispensing liquid condiments on to the plate, the flat bread, the roll bread, or the sliced meat with a condiment dispensing apparatus;

wrapping a sandwich in the order by conveying the sandwich to a wrapping mechanism comprising a plurality of cylinders and round belts, and operating the wrapping mechanism, wherein operating the wrapping mechanism comprises closing at least a portion of the round belts on itself to substantially enclose and create an at least semicylindrical shaped sandwich, introducing a wrapping material into the wrapping mechanism, and rotating the cylinders and round belts to completely encircle at least part of the sandwich with the wrapping material in a substantially cylindrical shape; and fulfilling an order as requested by a customer for at least one of a sandwich and a meal.

13. The method of preparing sandwiches and meals of claim 12, further comprising printing order details on at least one of a piece of wrapping paper and a receipt for the customer.

14. The method of preparing sandwiches and meals of claim 12, further comprising providing at least one camera and a monitor for showing a customer the operation of the method of preparing sandwiches and meals.

15. The method of preparing sandwiches and meals of claim 12, further comprising accepting payment through at least one of cash and credit card.

16. The method of preparing sandwiches and meals of claim 12, further comprising providing a choice of flat bread or non-flat bread.

17. A method of slicing meat comprising:
providing a rotating vertical spindle for retaining a meat cone; and
slicing a meat cone retained on the vertical spindle to produce a meat slice by operating a slicing mechanism having a slicing arm and a conical slicing wheel disposed on an end of the slicing arm, wherein slicing the meat cone comprises moving the slicing arm horizontally toward the meat cone and slicing the meat cone in a helical pattern by moving the slicing wheel vertically as the meat cone rotates on the vertical spindle; and wherein slicing the meat cone further comprises operating a first motor to move the slicing arm vertically, and operating a friction clutch mechanism to transfer power from a second motor to horizontally move the slicing arm toward or away from the meat cone, and following the contours of the meat cone with the conical slicing wheel by operating the friction clutch mechanism to transfer power from the second motor into the slicing arm to apply the conical slicing wheel into the meat cone.

18. A method of wrapping a sandwich comprising conveying the sandwich to a wrapping mechanism comprising a plurality of cylinders and round belts, and operating the wrapping mechanism, wherein operating the wrapping mechanism comprises closing at least a portion of the round belts on itself to substantially enclose and create an at least semicylindrical shaped sandwich, introducing a wrapping material into the wrapping mechanism, and rotating the cylinders and round belts to completely encircle at least part of the sandwich with the wrapping material in a substantially cylindrical shape.

* * * * *